US009235819B2

(12) United States Patent
Torii et al.

(10) Patent No.: US 9,235,819 B2
(45) Date of Patent: Jan. 12, 2016

(54) PRINTING SYSTEM, IMAGE FORMING APPARATUS, AND METHOD

(71) Applicant: CANON KABUSHIKI KAISHA, Tokyo (JP)

(72) Inventors: Minoru Torii, Irvine, CA (US); Attaullah Seikh, Irvine, CA (US); Rajini Giridharagopal, Irvine, CA (US); Jeremy Serfling, Newport Beach, CA (US); Mark Toshiaki Sato, Costa Mesa, CA (US); Edward Smith, Santa Clara, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 13/653,121

(22) Filed: Oct. 16, 2012

(65) Prior Publication Data
US 2013/0114100 A1 May 9, 2013

Related U.S. Application Data

(60) Provisional application No. 61/555,578, filed on Nov. 4, 2011, provisional application No. 61/555,594, filed on Nov. 4, 2011.

(51) Int. Cl.
*G06Q 10/06* (2012.01)
*G06F 11/07* (2006.01)
*H04N 1/00* (2006.01)

(52) U.S. Cl.
CPC .............. *G06Q 10/06* (2013.01); *G06F 11/079* (2013.01); *G06F 11/0733* (2013.01);
(Continued)

(58) Field of Classification Search
CPC ............ G06F 11/0733; G06F 11/0784; G06F 11/079; G06F 11/0793; H04N 1/00127; G06K 15/02

USPC .................................. 358/1.1–1.9, 1.11–1.18
See application file for complete search history.

(56) References Cited

U.S. PATENT DOCUMENTS 6,966,032 B1 * 11/2005 Anderson ...................... 715/708
2002/0059879 A1 * 5/2002 Komori et al. ................ 101/484
(Continued)

FOREIGN PATENT DOCUMENTS

CN      101165719 A      4/2008
CN      101971618 A      2/2011
(Continued)

OTHER PUBLICATIONS

Here Comes the Holodeck: Virtual Reality + Artificial Intelligence = New Training Tool, ScienceDaily, 2011, from http://www.sciencedaily.com/releases/2001/05/010510072050.htm#.
(Continued)

*Primary Examiner* — King Poon
*Assistant Examiner* — Ibrahim Siddo
(74) *Attorney, Agent, or Firm* — Canon U.S.A., Inc. IP Division

(57) ABSTRACT

An information processing apparatus, which is configured to communicate with a server apparatus and an image forming apparatus, comprises a receiving unit configured to receive AR information that includes AR guidance for a first operation of an image forming apparatus, wherein the AR information superimposes the AR guidance on an image that was captured by the information processing apparatus; a display control unit configured to command the information processing apparatus to display the AR guidance to guide a user to operate the image forming apparatus, and an obtaining unit configured to obtain information that originated from performance of the first operation by the image forming apparatus, wherein the receiving unit is further configured to receive AR information that includes additional AR guidance that presents operations for recovering from the error.

9 Claims, 31 Drawing Sheets

(52) U.S. Cl.
CPC ....... *G06F 11/0784* (2013.01); *G06F 11/0793* (2013.01); *H04N 1/00037* (2013.01); *H04N 1/00079* (2013.01); *H04N 1/00344* (2013.01); *H04N 2201/0094* (2013.01)

(56) References Cited

U.S. PATENT DOCUMENTS

| | | | | |
|---|---|---|---|---|
| 2008/0056736 | A1* | 3/2008 | Katsumi | H04N 1/00344 399/8 |
| 2011/0052083 | A1 | 3/2011 | Rekimoto | |
| 2011/0096844 | A1 | 4/2011 | Poupel | |
| 2011/0115816 | A1 | 5/2011 | Brackney | |
| 2012/0183137 | A1* | 7/2012 | Laughlin | H04N 7/185 380/200 |

FOREIGN PATENT DOCUMENTS

| | | | |
|---|---|---|---|
| CN | 102006548 A | | 4/2011 |
| JP | 2008-193640 | * | 2/2007 |
| JP | 2010-219879 | * | 9/2010 |
| JP | 2010-219879 A | | 9/2010 |

OTHER PUBLICATIONS

István Barakonyi et al., Ubiquitous Animated Agents for Augmented Reality, 2006.
Mykhaylo Kostandov et al., Robot Gaming and Learning using Augmented Reality, 2007.
Nick Heath, Augmented reality, machine learning and the cleric, Silicon.com, 2011, downloaded from http://www.silicon.com/technology/software/2011/02/08/augmented-reality-machine-learning-and-the-cleric-39746937/.
Dennis Del Favero et al., Scenario: Co-Evolution, Shared Autonomy and Mixed Reality, IEEE International Symposium on Mixed and Augmented Reality, 2010.
Nanae Shintani et al., Virtual Switch by Augmented Reality and RFID Technologies, 19th International Conference on Production Research, 2007.
Ciara Byrne, Augmented reality helps you fix your printer, Feb. 2011, from http://venturebeat.com/2011/02/10/augmented-reality-printer-metaio/.
Ronald T. Azuma, A Survey of Augmented Reality, Presence: Teleoperators and Virtual Environments 6, 4 (Aug. 1997), 355-385.
Steven J. Henderson et al., Augmented Reality for Maintenance and Repair (ARMAR), Aug. 2007.
H. Lipson et al., Online Product Maintenance by Web-Based Augmented Reality, CIRP Design Seminar on New Tools and Workflows for Product Development, 1998.
Petros Belimpasakis et al., A Web Service Platform for Building Interoperable Augmented Reality Solutions, International AR Standards Workshop—Oct. 11-12, 2010.
Jeremy Hsu, Augmented Reality Goggles Make Marine Mechanics More Efficient, POPSCI, posted Oct. 26, 2009.
Steven Feiner et al., Knowledge-based Augmented Reality for Maintenance Assistance, Columbia University Computer Graphics and User Interfaces Lab, viewed Jul. 2011.
Steven Henderson and Steven Feiner, Opportunistic Controls: Leveraging Natural Affordances as Tangible User Interfaces for Augmented Reality, Proceedings ACM Virtual Reality Software and Technology (VRST '08), Oct. 2008, pp. 211-218.
Steven Henderson and Steven Feiner, Opportunistic Tangible User Interfaces for Augmented Reality, IEEE Transactions on Visualization and Computer Graphics (TVCG), Jan./Feb. 2010 (vol. 16, No. 1), pp. 4-16.
Steven Henderson and Steven Feiner, Exploring the Benefits of Augmented Reality Documentation for Maintenance and Repair, IEEE Transactions on Visualization and Computer Graphics (TVCG), Oct. 2011 (vol. 17, No. 10), pp. 1355-1368.
Steven Henderson and Steven Feiner, Evaluating the Benefits of Augmented Reality for Task Localization in Maintenance of an Armored Personnel Carrier Turret, Proceedings of IEEE International Symposium on Mixed and Augmented Reality (ISMAR '09), Oct. 2009, pp. 135-144.
Steven Henderson and Steven Feiner, Augmented Reality in the Psychomotor Phase of a Procedural Task, Proceedings of IEEE International Symposium on Mixed and Augmented Reality (ISMAR '11), Oct. 2011, Basel, Switzerland, pp. 191-200.
Tom Simonite, Augmented Reality Meets Gesture Recognition, Technology Review, MIT, Sep. 15, 2011, from http://www.technologyreview.com/communications/38568/?p1=A2.
Rob Enderle, Qualcomm's secret mobile weapon: Augmented Reality, TG Daily, Feb. 24, 2011, from http://www.tgdaily.com/opinion/54313-qualcomm%E2%80%99s-secret-tablet-smartphone-weapon-augmented-reality.
New in Augmented Reality, Modern Mobile Apps, Mar. 2011.
Thomas Reicher, A framework for dynamically adaptable augmented reality systems, München, Techn. Univ., Diss., 2004.
Metaio Youtube Channel; date joined: Sep. 8, 2009; videos available at http://www.youtube.com/user/metaioAR/videos?sort=dd&flow=grid&view=0&page=1.
BMW Augmented Reality, Oct. 3, 2007, available at http://www.youtube.com/watch?v=P9KPJIA5yds.
Augmented Reality for Maintenance and Repair, Oct. 10, 2009, available at http://www.youtube.com/watch?v=mn-zvymlSvk.
AR in Service & Maintenance, Jul. 3, 2008, available at http://www.youtube.com/watch?v=0le-oWA1v5l&feature=related.
Mobile Augmented Reality for Maintenance, Aug. 31, 2010, available at http://www.youtube.com/watch?v=_6A3hT2GeRU.
Karen Kensek et al., Augmented Reality: An Application for Architecture, Eighth International Conference on Computing in Civil and Building Engineering, 2000.
Zhao Xincan et al., Research on Interaction Technique of Augmented Reality Maintenance Guiding System, Nanjing University of Aeronautics and Astronautics, Jun. 2008.

\* cited by examiner

PRINTING SYSTEM, IMAGE FORMING APPARATUS, AND METHOD

CROSS-REFERENCE TO RELATED APPLICATIONS

This application claims priority to U.S. Provisional Application No. 61/555,578, filed on Nov. 4, 2011, and to U.S. Provisional Application No. 61/555,594, filed on Nov. 4, 2011, both of which are hereby incorporated by reference.

BACKGROUND

1. Field

This application generally relates to management of image forming apparatuses.

2. Background

Image forming apparatuses (e.g., printers) sometimes have some errors and malfunctions. Repairing an image forming apparatus may be very complex, and some image forming apparatuses are so large that they are not easily carried to a repair facility.

SUMMARY

One of the aspects of the present disclosure relates to managing image forming apparatus. Also, one of the aspects of the present disclosure is directed to managing an image forming apparatus using augmented reality.

In some embodiments, an information processing apparatus, which is configured to communicate with a client apparatus and an image forming apparatus, comprises a receiving unit configured to receive status information from an image forming apparatus; a sending unit configured to send AR information that includes AR guidance regarding a first operation of the image forming apparatus to a client apparatus, wherein the AR information superimposes the AR guidance on an image captured by the client apparatus; an obtaining unit configured to obtain information which originated from the image forming apparatus and which includes an indication of an error that occurred in the image forming apparatus, wherein the information originates from performance of the first operation by the image forming apparatus; a determining unit configured to determine an error based on the information obtained by the obtaining unit; and a transfer unit configured to transfer AR information that includes additional AR guidance based on the determined error.

In some embodiments, an information processing apparatus, which is configured to communicate with a server apparatus and an image forming apparatus, comprises a receiving unit configured to receive AR information that includes AR guidance for a first operation of an image forming apparatus, wherein the AR information superimposes the AR guidance on an image of the image forming apparatus that was captured by the information processing apparatus; a display control unit configured to command the information processing apparatus to display the AR guidance; and an obtaining unit configured to obtain information that originated from performance of the first operation by the image forming apparatus and to use the obtained information to determine an error that occurred the image forming apparatus, wherein the receiving unit is further configured to receive AR information that includes additional AR guidance that presents operations for recovering from the error.

In some embodiments, a method performed by information processing apparatus that communicates with a client apparatus and an image forming apparatus comprises receiving status information; sending first AR information that commands a client apparatus to display AR guidance for a first operation of an image forming apparatus, wherein the AR guidance superimposes the AR guidance on an image captured by the client apparatus; obtaining information that originated from performance of the first operation by the image forming apparatus and that includes a sign regarding an error that occurred in the image forming apparatus; and transferring second AR information to command the client apparatus to display other AR guidance to recover from the determined error.

In some embodiments, a method performed by an information processing apparatus configured to communicate with a server apparatus and an image forming apparatus comprises receiving AR information that includes a command to display AR guidance for a first operation of an image forming apparatus that superimposes the AR guidance on an image that was captured by the information processing apparatus; displaying the AR guidance; and obtaining information that originated from performance of the first operation by the image forming apparatus; determining an error that occurred the image forming apparatus based on the obtained information; and receiving further AR information that includes a command to display other AR guidance to recover from the error.

DESCRIPTION

The following disclosure describes certain explanatory embodiments. Additionally, the explanatory embodiments may include several novel features, and a particular feature may not be essential to practice the systems and methods described herein. Various example embodiments, features, and aspects will be described in detail below with reference to the drawings.

Figure 1A:
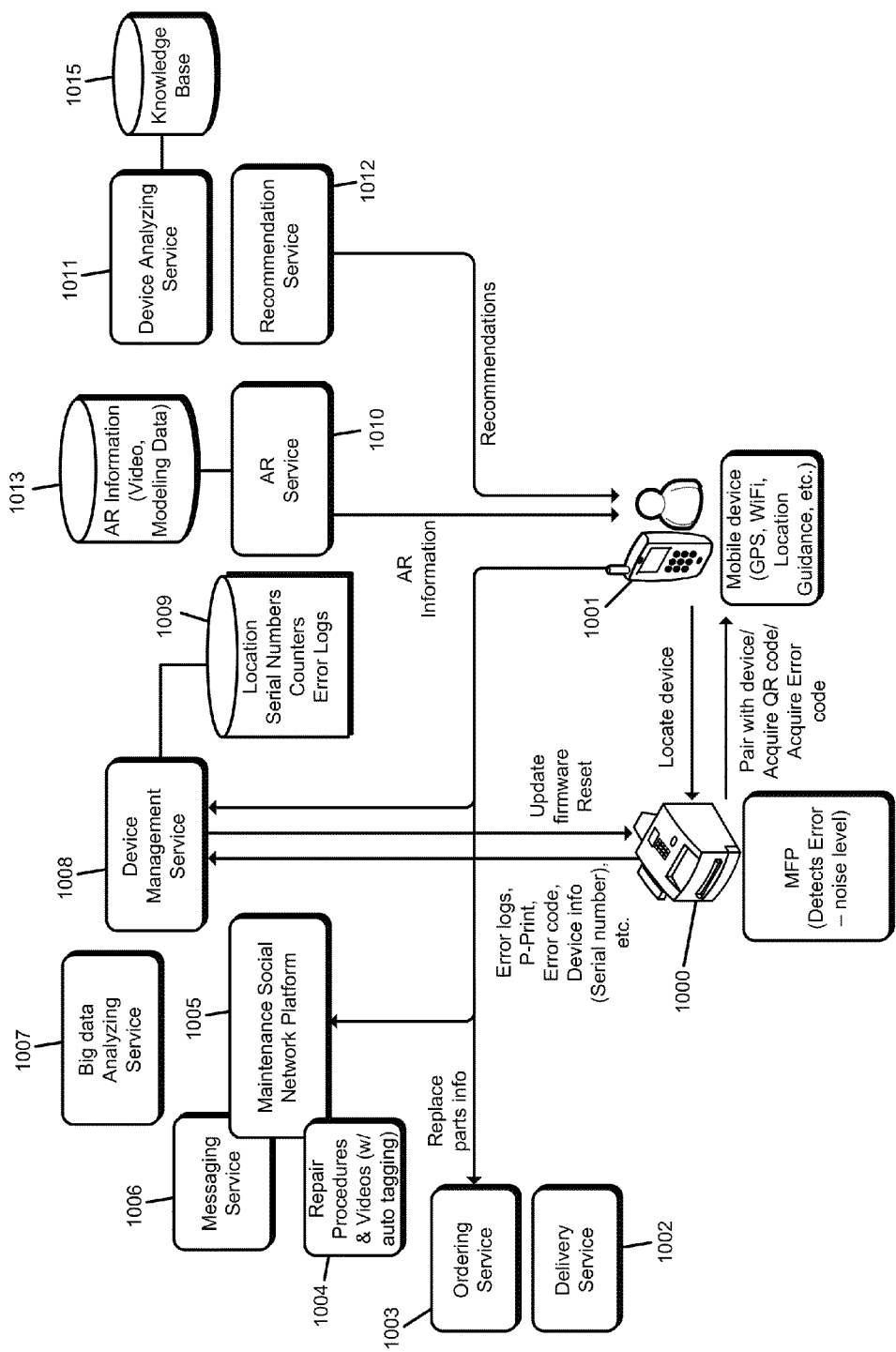
FIG. 1A illustrates an example embodiment of a system for servicing an image forming apparatus.

FIG. 1A illustrates an example embodiment of a system for servicing an image forming apparatus. The system includes an augment reality (AR) service 1010, a device management service 1008, a device analyzing service 1011, a recommendation service 1012, a big-data analyzing service 1007, a delivery service 1002, and a multi-functional peripheral device (MFP) 1000. The MFP 1000 may be a multi-function printer, a single function printer, a fax, etc. The services may be implemented as cloud services (e.g., distributed computing services). Cloud services may operate on one or more virtual machines. Virtual machines may operate on one or more physical processors (including, for example, central processing units (CPUs), GPUs, and other hardware circuits) and/or one or more physical computing devices.

The AR service 1010 provides videos and modeling data in a database of AR information 1013 for easy guidance of device operation. The device analyzing service 1011 recognizes device error(s) of the MFP 1000 and determines the reason(s) for the error, for example based on one or more the algorithms. The device management service 1008 identifies the device and provides an error history for analyzing the reasons for the error(s). The MFP 1000 may send its serial number(s)/current device configuration information to the device management service 1008, for example via HTTPS/REST (See FIG. 1B). The MFP 1000 also sends the its status and logs, for example errors and jams, to the device management service 1008.

A mobile application being executed by the mobile device 1001 may send the serial number(s) of the MFP 1000 to the device management service 1008. The serial number(s) of the MFP 1000 can be input via a user interface (see, e.g., FIG. 11), via an Optical Character Recognition (OCR) application, or via a QR code recognition application. The OCR application may read the serial number(s) of the MFP 1000 after capturing the device information from a the sticker or a front panel. The QR code recognition application may recognize the serial number after capturing the QR code. The serial number of the MFP 1000 is sent to the device management service 1008.

The mobile application may register the knowledge base (KB) 1015 with the device analyzing service 1011, which provides the solution to resolve an error. Also, the device analyzing service 1011 may register the KB 1015 after learning how to fix issues. The location, serial numbers, counters, and error logs may be obtained by the device management service 1008, and the device management service 1008 may store the information in the data base 1009. The device analyzing service 1011 may access the data base 1009 via the device management service 1008. The device analyzing service 1011 may refer to one or more of the KB 1015 and the data base 1009 (which stores location, serial numbers, counters, error logs) via the device management service 1008 to determine a solution to the error and determine the AR indexes to the corresponding AR information. The recommendation service 1012 provides candidate solutions if a specific solution cannot be found. The device analyzing service 1011 and/or the recommendation service 1012 may send the candidate solutions and/or AR indexes to the AR service 1010.

Since an error code, like Exxx, corresponds to an actual error, the device analyzing service 1011 could select the AR index that corresponds to the specific error. Based on the AR index selected by the device analyzing service 1011, the AR service 1010 obtains AR information, for example an AR video and/or AR modeling data (e.g., 3-dimensional data that describes shapes, coordinates, etc., for AR illustrations), from the database of AR information 1013. Also, AR information provided by the AR service 1010 may combine AR guidance with live video/images captured by a camera of the mobile device 1001. The AR service 1010 sends the obtained AR information to the mobile device 1001 via the network. Regarding the error history, the device management service 1008 predicts which part of the device should be fixed and may find appropriate AR information to send to and display on the mobile device 1001. When an error history indicates jams happen a lot, that may be the specific solution to an error. A detailed explanation of error history is provided below. The recommendations may indicate a few possible solutions, and each solution may link to an AR information. Also, the system may provide a couple of AR information, depending on the process used to fix the error(s).

Figure 11:
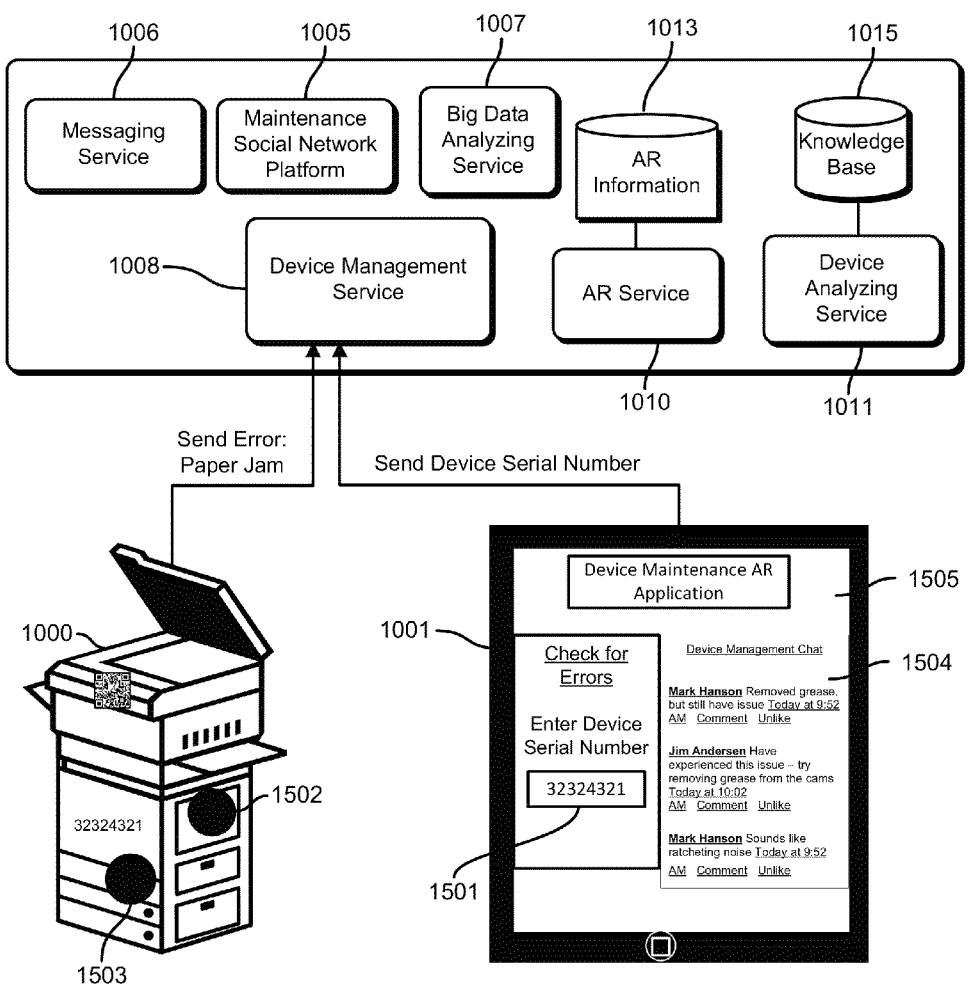
FIG. 11 illustrates an example embodiment of a system for servicing an image forming apparatus.

Sometimes a user may need to interrupt a video that includes AR information (also referred to as an "AR video"). For example, the user may stop the AR video when the user is operating something and cannot see the AR video. The AR video provides an interface to interact with users, for example by pushing a button or a "go to next button," to provide step by step guidance. Instant messaging (IM) may be provided, and IM can interact with an application on the mobile device 1001. By using IM and the messaging service 1006, the user/service technician may chat with a boss/specialist in a service center. Scalable machine learning technology, such as Mahout (an open source machine learning system), is used in the big data analyzing service 1007. The big data analyzing service uses the communication results of the messaging service 1006 and maintenance social network platform 1005 between the users/service technicians. The device management chat 1504 in FIG. 11 shows one example of communication between users/service technicians using the maintenance social network platform 1005 and the messaging service 1006.

If a part needs to be ordered, a user or service technician can order the part by using the user mobile application (see, e.g., FIG. 1C) or a service technician mobile application (see, e.g., FIG. 1D), which communicate with an ordering service 1003 and/or a delivery service 1002.

Figure 1B:
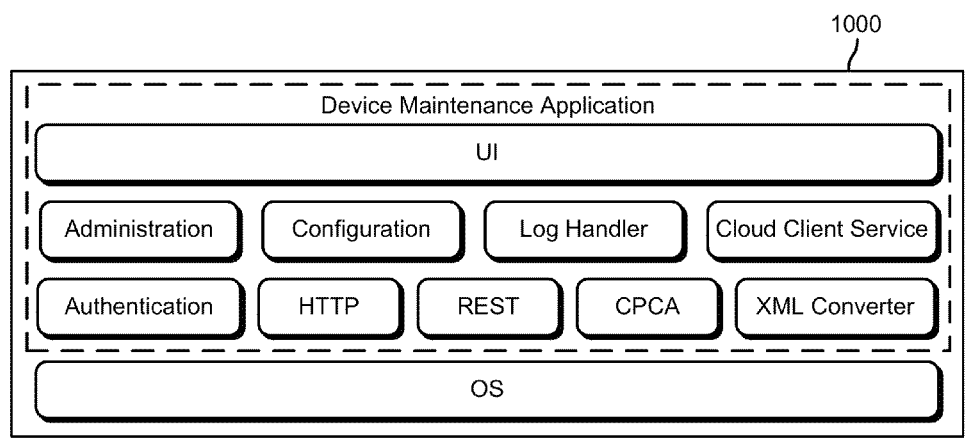
FIG. 1B illustrates an example embodiment of a multi-function peripheral device.

FIG. 1B illustrates an example embodiment of a multi-function peripheral device 1000, including the module structure of a device maintenance application. A device maintenance application operates on the MFP 1000 and includes the following components: UI, Administration, Configuration, Log Handler, Cloud Client service, Authentication, HTTP, REST, Proprietary Command (CPCA), and XML converter. Users can interact with the device maintenance application using the UI component. The Administration component performs administration processes, such as setting up passwords, setting the URL of the device management service, and setting the polling interval. The Configuration component gets the device information, such as device ID, device name, serial number, and location, and may get the information via the CPCA component. The Log Handler component gets the device's logs, such as error logs and status logs, and may get the logs via the CPCA component. The Cloud Client service component communicates with the device management service 1008 on the cloud. In regards to the protocols, the device maintenance application may use any applicable protocol, for example REST and HTTP. The XML Converter component handles the data sent to the Device Management service. Prior to accessing the device management service 1008 on the cloud, the device maintenance application may authenticate to the device management service 1008 using the Authentication component.

Figure 1C:
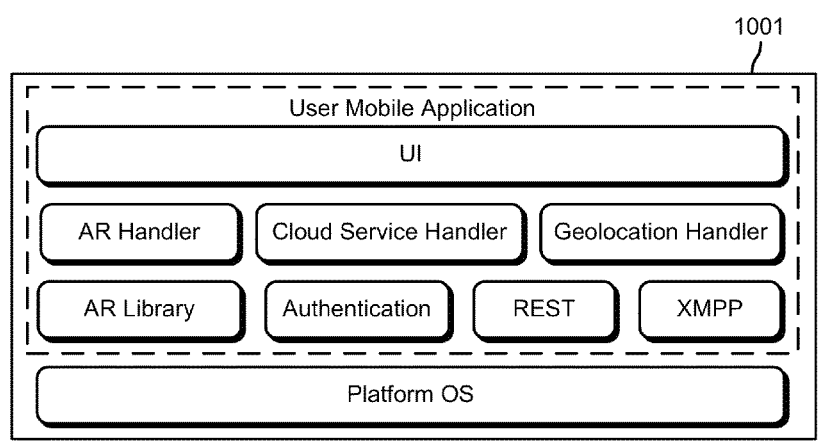
FIG. 1C illustrates an example embodiment of a mobile device.

FIG. 1C illustrates an example embodiment of a mobile device 1001, including the module structure of a user mobile application. The user mobile application includes the following components: UI, AR Handler, Cloud Service Handler, Geolocation Handler, AR library, Authentication, REST, and XMPP. The end user can interact with the user mobile application via the UI component. The AR Handler component provides AR information from the AR library to the UI component. The AR Handler component combines the recognized object and the video. The Cloud Service Handler component communicates with the AR service 1010, the messaging service 1006, the recommendation service 1012 and/or the device analyzing service 1011, for example via REST and/or XMPP protocols. The Cloud Service Handler component also communicates with the maintenance social network platform 1005 and the messaging service 1006 in order to communicate with service technicians. If a replacement part of a device needs to be ordered, the Cloud Service Handler component can access an ordering service 1003 and/or a delivery service 1002. The Cloud Service Handler component can send messages for servicemen to the messaging service 1006, get the AR information from the AR service 1010, and/or get analyzed results from the device analyzing service 1011. Prior to accessing the services, authentication may need to be performed by the Authentication component. The Geolocation Handler component provides location information.

Figure 1D:
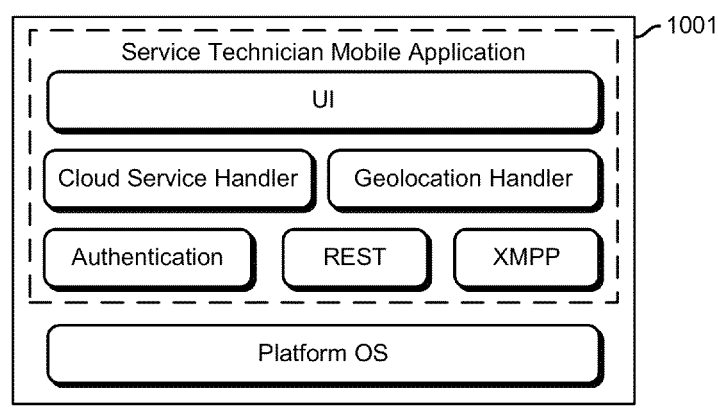
FIG. 1D illustrates an example embodiment of a mobile device.

FIG. 1D illustrates an example embodiment of a mobile device 1001, including a service technician mobile application module structure. The service technician mobile application includes the following components: UI, Cloud Service Handler, Geolocation Handler, Authentication, REST and XMPP. A service technician can interact with the service technician mobile application via the UI component. The Cloud Service Handler component communicates with the maintenance social network platform 1005, the messaging service 1006 and the device analyzing service 1011, for example via REST and/or XMPP protocols. If a replacement part of device needs to be ordered, the Cloud Service Handler component can access an ordering service 1003 and/or a delivery service 1002. The Cloud Service Handler component can send end user messages to the messaging service and get analyzed results from the device analyzing service 1011. Prior to accessing the services, authentication may need to be performed by the Authentication component. The Geolocation Handler component provides location information.

Figure 1E:
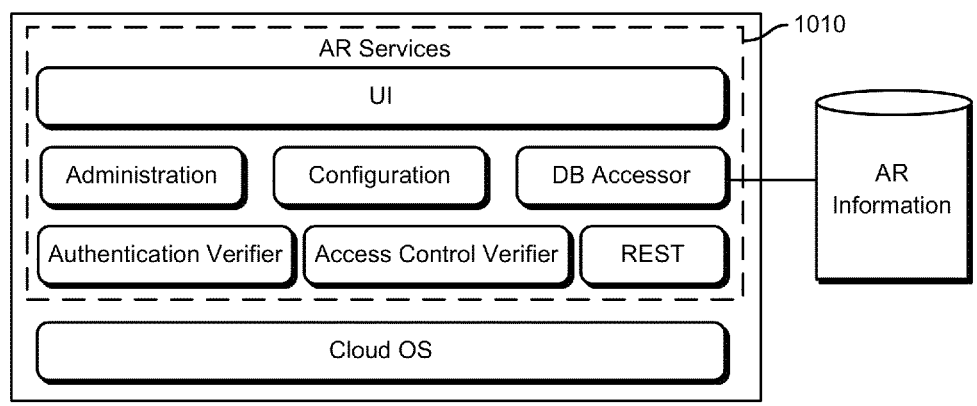
FIG. 1E illustrates an example embodiment of an augmented reality service.

FIG. 1E illustrates an example embodiment of an augmented reality service, including an AR service 1010 module structure. The AR service 1010 includes the following components: UI, Administration, Configuration, DB Accessor, Authentication Verifier, Access Control Verifier, and REST. Users can interact with the AR service 1010 via the UI component. The administrator of the AR service 1010 can manage AR information like videos and modeling data, manage who can access the services, and manage certifications of the service using the Administration component. The Configuration component maintains the number of max handled requests, the password to access the AR information storage, and the API keys to receive a REST request. The REST component receives the requests from the clients, for example the user/service technician mobile applications. When the REST component receives the requests, before providing the service authentication and access control may be performed by the Authentication Verifier component and the Access Control Verifier component, respectively. The DB Accessor retrieves and stores AR information, for example videos and modeling data, from/in the AR information storage.

Figure 1F:
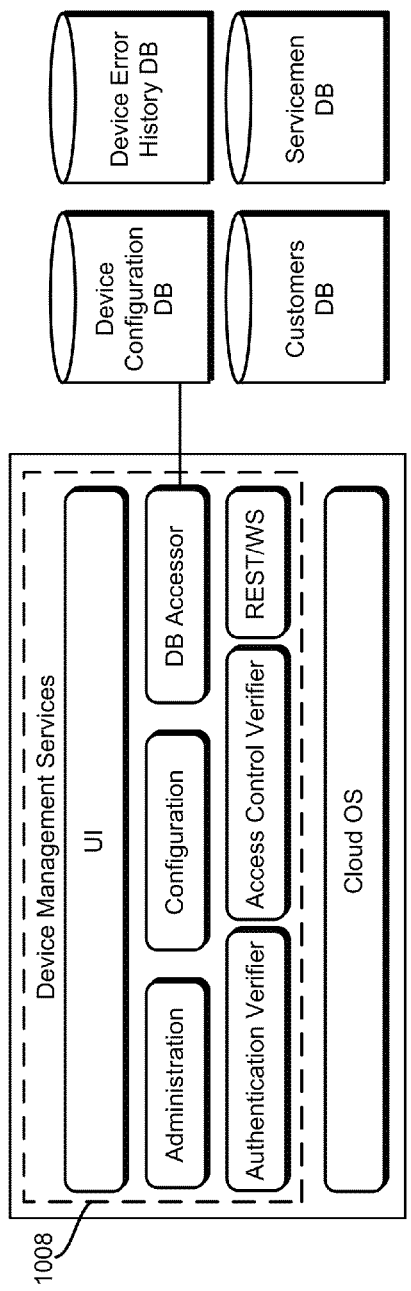
FIG. 1F illustrates an example embodiment of a device management service.

FIG. 1F illustrates an example of a device management service 1008, including the module structure. The device management service 1008 includes the following modules: UI, Administration, Configuration, DB Accessor, Authentication Verifier, Access Control Verifier, and REST/WS. Users can interact with the service via the UI component. The administrator of the service can manage device information, customer information, servicemen information, access rights to the service, and the certifications of the service by using the Administration component. The Configuration component maintains the number of max handled requests, the password to access each database, and the API keys to receive REST/WS requests. The REST/WS component receives the requests from the clients, for example the device management application on the devices and the user/service technician mobile applications. When the REST/WS component receives the requests, before providing the service both authentication and access control may be performed by the Authentication Verifier component and the Access Control Verifier component. The DB Accessor component retrieves and stores device configurations, device errors histories, customer information, and servicemen information from/in the device configuration, device error history, customers, and servicemen information databases.

Figure 1G:
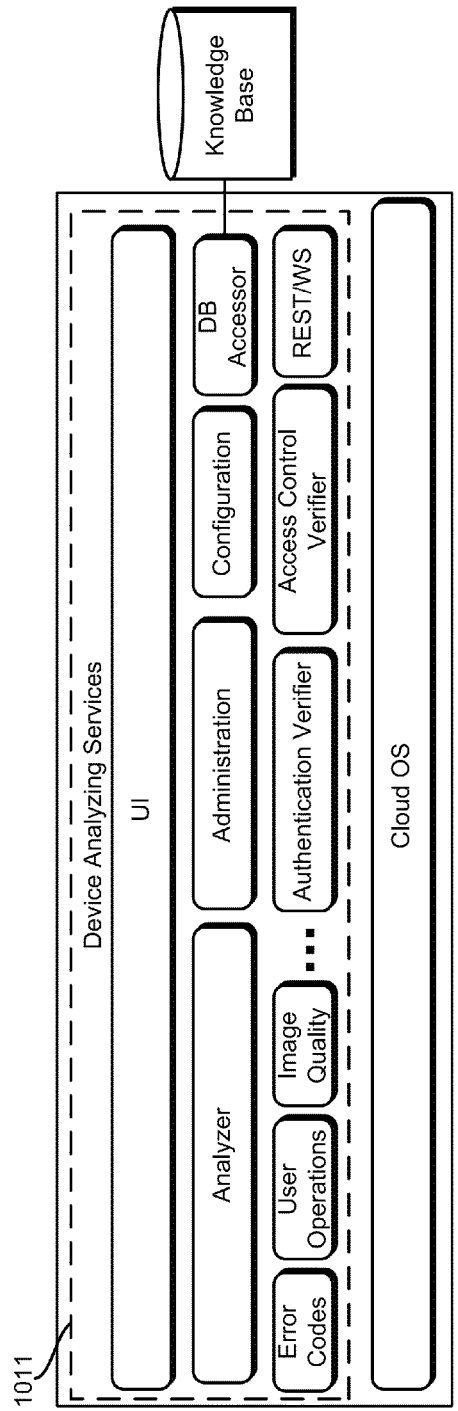
FIG. 1G illustrates an example embodiment of a device analyzing service.

FIG. 1G illustrates an example embodiment of a device analyzing service 1011, including the module structure. The device analyzing service 1011 includes the following components: UI, Administration, Configuration, DB Accessor, Authentication Verifier, Access Control Verifier, REST/WS, and Analyzer. Users can interact with the device analyzing service 1011 via the UI component. The administrator of the service can manage the knowledge database, access rights to the service, and the certifications of the service by using the Administration component. The Configuration component maintains the number of max handled requests, the password to access the messages database, and the API keys to receive REST or Web service requests. The REST/WS component receives the requests from the clients, for example from the user/service technician mobile applications. When the REST/WS receives the requests, before providing the service authentication and access control may be performed by the Authentication Verifier component and the Access Control Verifier component. The DB Accessor retrieves and stores knowledge from/in the Knowledge Base database. The Analyzer component has pluggable components like an error codes component, an image quality component, and a user operations component. In order to analyze MFP errors, different analyzing methods may be performed. The Error Codes component analyzes why errors occur based on the error codes. In the Knowledge Base database, the description of how to resolve errors is associated with the respective error code. The Image Quality component analyzes image quality errors/issues. The Analyzer component analyzes why errors occur based on the device counter information and measured color in the images. The User Operations component analyzes wrong operations by users and analyzes media types and device configurations.

Figure 1H:
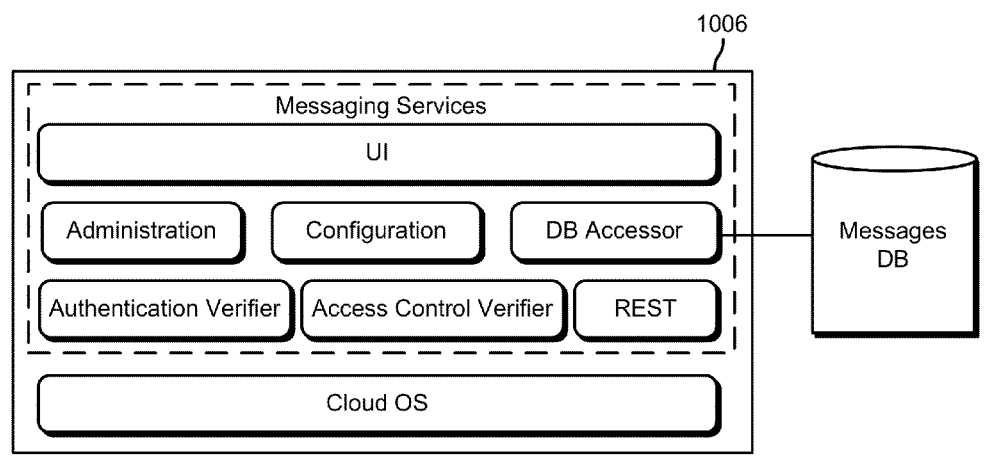
FIG. 1H illustrates an example embodiment of a messaging service.

FIG. 1H illustrates an example embodiment of a messaging service 1006, including the module structure. The messaging service 1006 includes the following components: UI, Administration, Configuration, DB Accessor, Authentication Verifier, Access Control Verifier, and REST. Users can interact with the service via the UI component. An administrator of the service can manage messages in the database, manage access rights to the service, and manage certifications of the service by using the Administration component. The Configuration component manages the number of max handled requests, the passwords to access the messages database, and the API keys to receive REST requests. The REST component receives requests from the clients, for example the User/Service technician Mobile Applications. When the REST component receives the requests, before providing the service authentication and access control may be performed by the Authentication Verifier component and the Access Control Verifier component. The DB Accessor component retrieves and stores messages from/in the messages database.

Figure 1I:
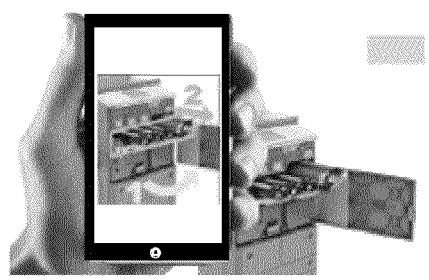
FIG. 1I illustrates an example embodiment of a mobile device.

FIG. 1I illustrates an example embodiment of a mobile device. As shown in FIG. 1I, the user directs the camera of the mobile device toward the MFP 1000. The Mobile User Application merges the captured movie and the AR information (e.g., video and modeling data) that shows the guide that implements the solution. In some embodiments, the AR information (e.g., video and modeling data) is promptly merged with the captured movie by the mobile device (see, e.g., FIG. 23).

Figure 23:
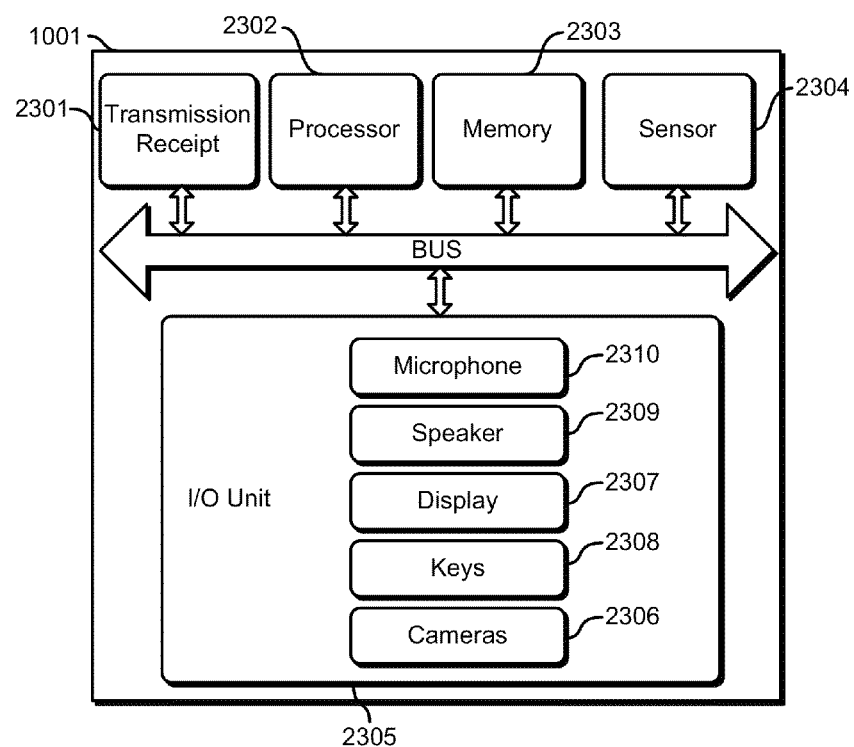
FIG. 23 illustrates an example embodiment of a mobile device.

FIG. 23 illustrates an example embodiment of a mobile device. Modules (e.g., the modules shown in FIG. 1C and/or FIG. 1D) are stored in the memory 2303. The processor 2302 (which may include one or more microprocessor and other hardware circuits) executes the instructions in the modules and/or implements algorithms for the mobile device 1001 that are shown in the flow diagrams. The processor 2302 may include multiple cores, multiple CPUs, and/or GPUs. The mobile device 1001 includes a transmission/receipt unit 2301 that controls data transmission and data receipt processes. One or more units may be implemented by one or more processors, computer-readable media (e.g., RAM, flash memory, magnetic storage), and/or other circuits (e.g., integrated circuits, discrete circuits). The processor 2302 controls the transmission/receipt unit 2301, the memory 2303, the sensor 2304, and the I/O unit 2305. The I/O unit 2305 includes a speaker 2309, a display unit 2307 that includes a display control unit, a keys unit 2308, a microphone 2310, and one or more cameras 2306. A user can input data and commands via the keys unit 2308, and the display 1505 in FIG. 11 may include a touch panel function that accepts a user's or a service technician's input. A user or a service technician can provide various inputs via a user interface displayed on the display unit of the mobile device 1001.

Figure 24:
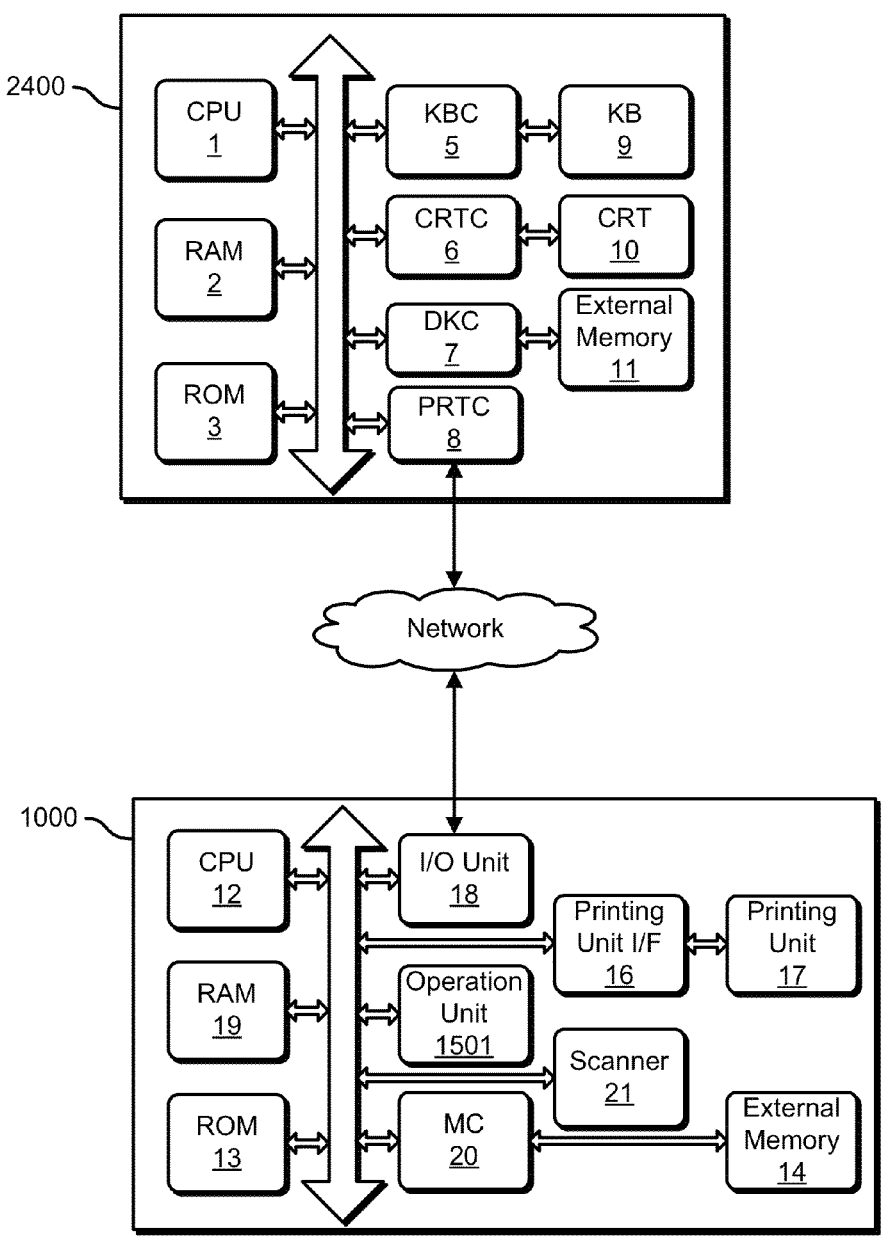
FIG. 24 illustrates an example embodiment of a system for servicing an image forming apparatus.

The mobile device 1001 is configured to communicate with a host computer 2400 and an MFP 1000 (see, e.g., FIG. 24). The transmission/receipt unit 2301 is configured to receive AR information that controls the mobile device 1001 to display AR guidance regarding an operation of the MFP 1000 by superimposing the AR guidance on an image of the MFP 1000 that was captured by the mobile device 1001, and the AR guidance corresponds to the received AR information. The display control unit controls the mobile device 1001 to display the AR guidance to guide a user to operate the MFP 1000. The transmission receipt unit 2301 obtains information originating from the MFP 1000 according to an operation that the user performs according to the AR guidance that is displayed by the display control unit. The transmission receipt unit 2301 uses the information to determine that an error occurred in the MFP 1000. The transmission receipt unit 2301 receives AR information and the processor 2302 controls the mobile device 1001 to display additional AR guidance to recover from the error.

FIG. 24 illustrates an example embodiment of a system for servicing an image forming apparatus. An MFP 1000 is configured to receive print data from the host computer 2400 and perform printing based on the received print data. One or more computers, for example the host computer 2400, perform the services shown in 1002-1012 in FIG. 1A. The MFP 1000 stores modules, for example the modules shown FIG. 1B, in the external memory 14 and loads the modules to RAM 19. The CPU 12 and the CPU 1 of the host computer 2400 may include multiple cores, CPUs, and/or GPUs.

In the host computer 2400, the CPU 1 controls various devices connected to a system bus according to one or more programs stored in a RAM 2. The RAM 2 also functions as a main memory or a work area of the CPU 1. A ROM 3 stores various programs and data, for example the modules shown in FIG. 1E to FIG. 1H, and the ROM 3 includes various storage areas for storing respective programs or data. For example, the ROM 3 may include a font ROM 3a for storing various font data, a program ROM 3b for storing a boot program or BIOS, and a data ROM 3c for storing data.

A keyboard controller (KBC) 5 controls the receipt of commands or data via a keyboard (KB) 9 or a pointing device (a mouse). A CRT controller (CRTC) 6 controls the display operations of a CRT display (CRT) 10. A disk controller (DKC) 7 controls accesses to an external memory 11, such as a hard disk. A printer controller (PRTC) 8 is connected to the MFP 1000 via a bidirectional interface and controls communication between the host computer 2400 and the MFP 1000.

The PRTC 8 and the I/O Unit 18 may comply with a predetermined network protocol and other communication protocols, including wireless protocols. The external memory 11 may include a hard disk (HD), a magneto-optic (MO), a floppy disk, and/or an optical disc (e.g., CD, Blu-ray disc).

Applications, which may including a customization tool program (hereinafter, referred to simply as a customization tool) stored in a module, are loaded from the external memory 11 into the RAM 2 and executed by the CPU 1. The CPU 1 also converts (rasterizes) print data into outline font data and stores the resultant data in the RAM 2 so that the resultant data can be displayed on the CRT 10 in a WYSIWYG (What You See Is What You Get) manner. If a command is issued, for example by clicking a particular point on the CRT 10 with a mouse cursor, the CPU 1 opens a corresponding window and performs data processing according to the command.

The host computer 2400 communicates with a mobile device 1001 and the MFP 1000. Also, the PRTC 8 is configured to receive status information. The PRTC 8 is further configured to send AR information that commands the mobile device 1001 to display AR guidance regarding an operation of the MFP 1000 by superimposing the AR guidance on an image captured by the mobile device 1001. The AR information corresponds to the received status information. The PRTC 8 is configured to obtain information (e.g., an image scanned by the MFP 1000, see FIG. 16), which was generated by the MFP 1000 (e.g., a printout, an image) according to a user's operation that was guided by the AR guidance displayed on the mobile device 1001 (or other client device) and which includes a sign regarding an error that occurred in the MFP 1000. Furthermore, the CPU 1 in the host computer 2400 determines an error based on the information obtained by the PRTC 8. And the PRTC 8 transfers the AR information that controls the mobile device 1001 to display additional AR guidance to recover from the determined error.

Now, the structure of the MFP 1000 is described. A CPU 12 generally controls the operations of the MFP 1000. The RAM 19 may function not only as the main memory and the work area of the CPU 12, but also as an area in which information is stored in an output form and as an area in which environmental data is stored. The RAM 19 also includes a NVRAM (Non-Volatile RAM) area and is designed to be extensible in memory capacity by connecting an optional RAM to an extension port (not shown). The ROM 13 includes a font ROM 13a for storing various font data, a program ROM 13b for storing a control program executed by the CPU 12, and a data ROM 13c for storing various kinds of data. An I/O unit 18 transmits and receives data to or from the host computer 2400, and the I/O unit 18 provides an interface to a network, which may include the internet. A scanner 21 can read paper to generate image data.

Access to an external memory 14 is controlled by a memory controller (MC) 20. The external memory 14 may include, for example, a HD, a MO, a floppy disk (FD), or an IC card. The external memory 14 is used to store font data, an emulation program, form data, etc. If which no external memory 14, such as a hard disk, is connected, information used by the host computer 2400 is stored in the data ROM 13c of the ROM 13. There is no particular restriction on the number of external memories 14. For example, an optional font card for providing optional font data in addition to the built-in font data or an external memory that stores a program for interpreting an additional printer control language may also be connected.

An operation unit 1501 has an operation panel via which a user inputs a command or data. The operation panel includes, for example, switches and LED indicators. The operation panel may further include a NVRAM for storing printer mode setting information received via the operation panel.

In accordance with the control program stored in the program ROM 13b of the ROM 13, the CPU 12 outputs an image signal as output information to the printing unit (printer engine) 17 via the printing unit interface 16. The CPU 12 is capable of communicating with the host computer 2400 via the I/O unit 18. For example, the CPU 12 is capable of receiving print data transmitted from the host computer 2400 and transmitting information indicating the status of the MFP 1000 to the host computer 2400.

Also, FIG. 1E, FIG. 1F, and FIG. 1H may be implemented on a cloud OS. A cloud OS includes distributed systems. The cloud OS operates on at least one or more CPUs. The cloud OS manages networked storage, and the networked storage stores the modules described in FIG. 1E, FIG. 1F, and FIG. 1H. The one or more CPUs execute the instructions in the modules described in FIG. 1E, FIG. 1F, and FIG. 1H, for example to implement the methods described herein.

Figure 2A:
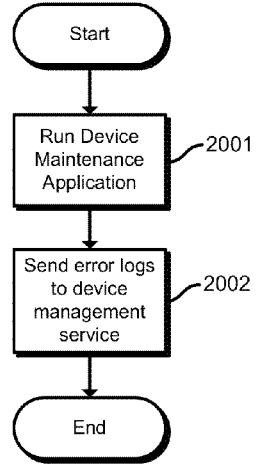
FIG. 2A illustrates an example embodiment of a method for operating a device management application on an MFP.

FIG. 2A illustrates an example embodiment of method for operating the device maintenance application on an MFP. The method is performed at least in part by the MFP 1000. The device maintenance application is started in block 2001, for example when the MFP 1000 boots. The device maintenance application sends error logs, which include error codes, to the device management service 1008 in block 2002. For example, the device maintenance application periodically sends error logs to the device management service 1008. When an error happens, the device management application sends a notification of the error to the device management service 1008.

Figure 2B:
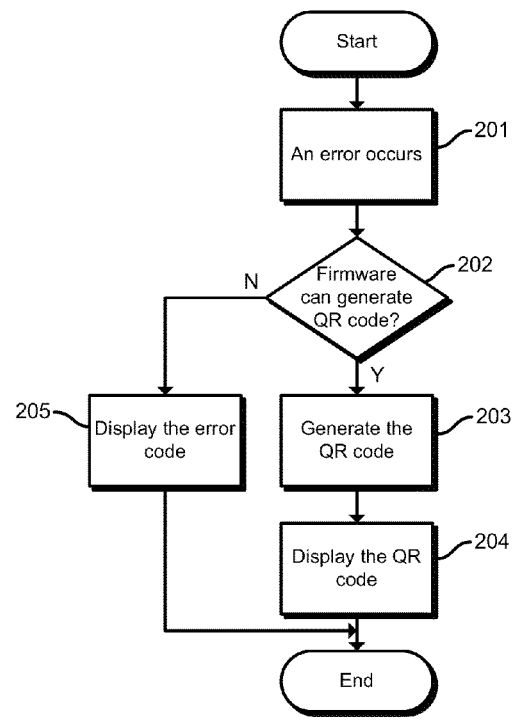
FIG. 2B illustrates an example embodiment of a method for identifying an error in an MFP.

In FIG. 2B, which illustrates an example embodiment of a method for identifying an error in an MFP, in block 201 the device maintenance application operating on the MFP 1000 recognizes that one or more errors have occurred. In block 202, the device maintenance application determines if the MFP's firmware can generate a QR code (e.g., if the firmware still has enough functionality to generate the QR code). If yes (block 202=YES), the flow moves to block 203, where the device maintenance application (or other component of the MFP 1000) generates a QR code, which may include the error code and other device information. Next, in block 204, the MFP 1000 displays the QR code on a display panel. However, if in block 202 the firmware cannot generate the QR code (block 202=NO), then the flow proceeds to block 205, where the MFP 1000 displays the error code on a display panel.

After the device management service 1008 receives the error code/QR code, the device management service 1008 sends the error code/QR codes to the device analyzing service 1011, which searches for the specific solution based on the error code(s). If the error(s) frequently occur, the device analyzing service 1011 analyzes the possibilities of repairing/replacing some parts. When the solution is part repair or replacement, the device analyzing service 1011 sends a notification to the mobile device 1001. If some parts are to be purchased using the user mobile application in FIG. 1C, the flow proceeds to the purchase process. The user mobile application in FIG. 1C sends an order for the part to the ordering service 1003. Also, if any part must be purchased, the user mobile application in FIG. 1C gets AR information from the AR service 1010 that identifies the part that needs to be replaced. Also, the AR information shows the user how to fix the error, which includes replacing the part. For example, the AR information may show the solutions for resolving issues regarding waste toner full (e.g., the waste toner container is full) and issues regarding cleaning mirrors.

When the user receives the new/repaired part, the user's mobile application captures the part's QR code, uses NFC (near-field communication) to get the part number, or receives the part number from manual input. The user mobile application in FIG. 1C recognizes the AR index and gets the AR information from the AR service 1010. Based on the AR information, the mobile application shows the AR guidance (which shows the user how to fix the error) and recognizes the part to be fixed. For example, the AR information may show, on the display of the mobile device 1001, the procedure for replacing the fuser.

When multiple solutions correspond to an error, a user may send the message to the service contact via the messaging service 1006 via the user mobile application. The messaging service contact receives the message, decides which solution is appropriate, and responds to the user. When the user receives the solution from the service contact, the user also receives the AR information if no replacement part purchase is required. If purchase is required, the flow proceeds to the purchase process.

Figure 3:
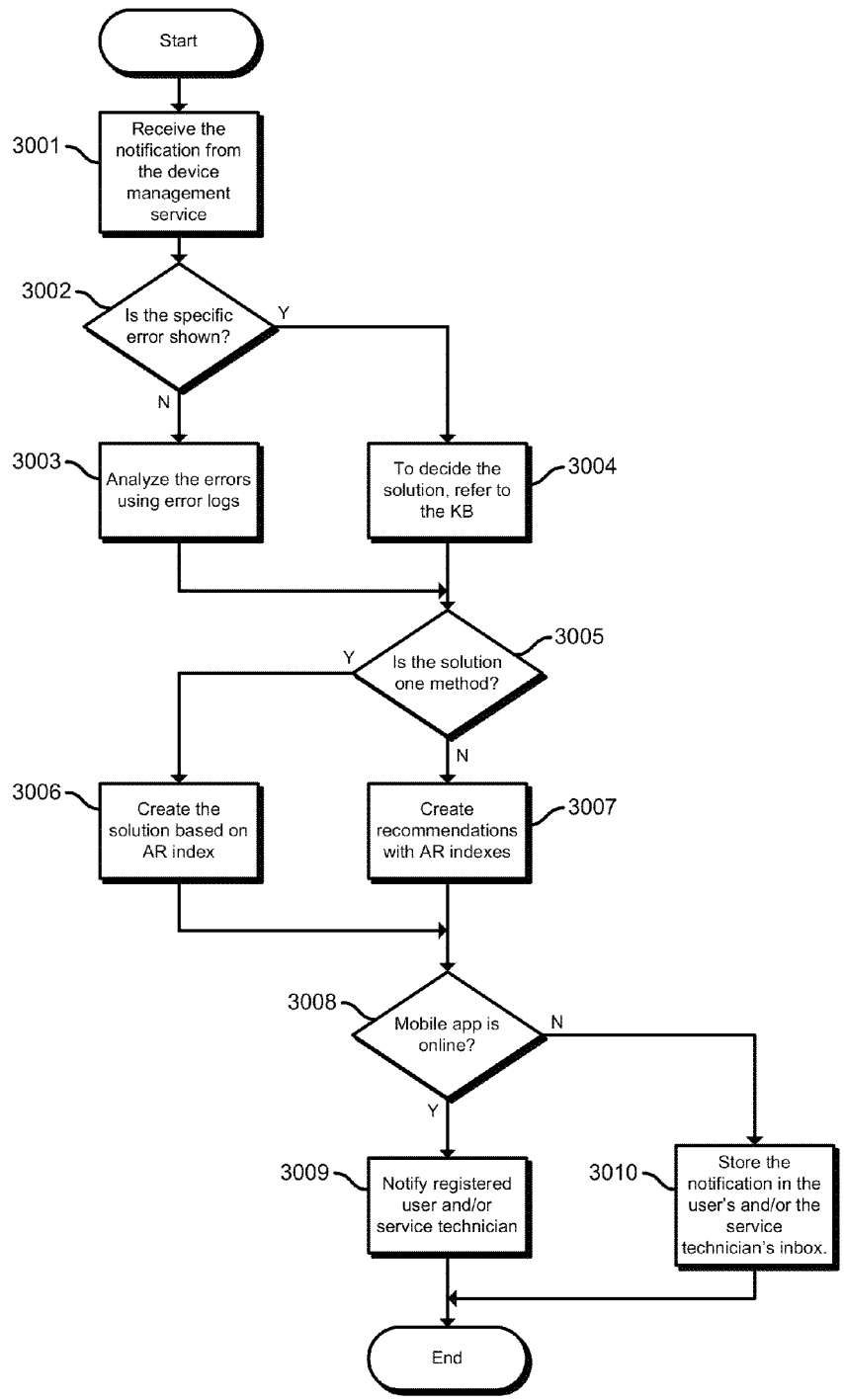
FIG. 3 illustrates an example embodiment of a method for sending AR information to a mobile device.

FIG. 3 illustrates an example embodiment of a method for sending AR information to a mobile device. The method may be performed by the device analyzing service 1011. The flow starts, and in block 3001 the device analyzing service 1011 receives the notification from the device maintenance service 1008. If the received error shows the specific error (block 3002=YES), the device analyzing service 1011 refers the error to the KB database at block 3004 and the flow proceeds to block 3005. If the received error is not a specific error (block 3002=NO), then in block 3003 the device analyzing service 1011 analyzes the error using the error logs, the device configuration, the scanned print image, the knowledge base of errors, and/or the service information, and the flow proceeds to block 3005.

In block 3005, the device analyzing service 1011 checks whether or not the solution is one repair procedure. If yes, then in block 3006 the device analyzing service 1011 creates the solution information (device repair procedures to fix the error), for example check the power of the paper deck or check the connection of the serial cable, for a user or a service technician based on the AR index, which corresponds to the AR information. If there are multiple candidate solutions (block 3005=NO), in block 3007 the device analyzing service 1011 creates the recommendations/possible solutions with the AR indexes after communicating with the recommendation service 1012, and the flow proceeds to block 3008. In block 3008, the device analyzing service 1011 confirms whether a user (or service technician) mobile application in the mobile device 1001 is powered on and connected and logged in.

When the user (or service technician) mobile application is online (block 3008=YES), in block 3009 the application notifies the user/service technician of the solution or recommendations, the user/service technician may be registered in a user database or a service technician database (in the data base 1009) associated with the device that has the error, and then the flow ends. If the mobile application is offline (block 3008=NO), in block 3010 the notification is stored in the user's/service technician's inbox in the mobile device 1001 and the flow ends.

Figure 4:
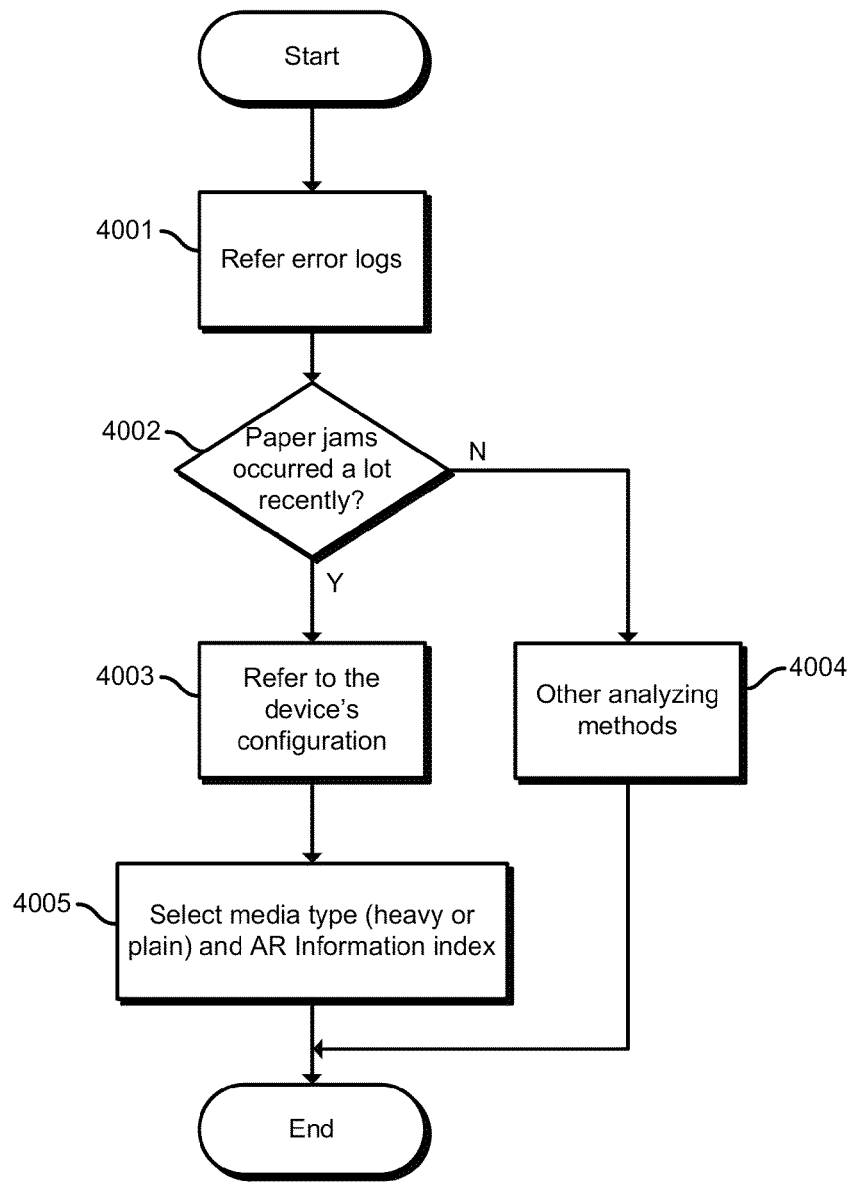
FIG. 4 illustrates an example embodiment of a method for identifying how to repair an error that frequently occurs.

FIG. 4 illustrates an example embodiment of a method for identifying how to repair an error that frequently occurs. FIG. 4 is one of example of block 3003 in FIG. 3. In this example, the error is a paper jam. In order to analyze the paper jam error, in block 4001 the device analyzing service 1011 first refers to error logs/history in the data base 1009 via the device management service 1008. If the device analyzing service 1011 determines that the logs indicate that paper jams occur frequently (block 4002=YES), in block 4003 the device analyzing service 1011 refers to the device configuration of the MFP 1000 in the KB 1009 in order to get the media type. Then in block 4005, the device analyzing service 1011 determines that the cause of the error is that the device does not select the right media type and determines that the media type should be changed, for example from heavy to plain or from plain to heavy. In block 4005, the device analyzing service 1011 gets the AR video index that shows the user/service technician how to change the media type, and then the flow ends. If the device analyzing 1011 service determines that paper jams do not occur a lot recently (block 4002=NO), the flow proceeds to the other analyzing methods in block 4004, and then the flow ends.

Figure 5:
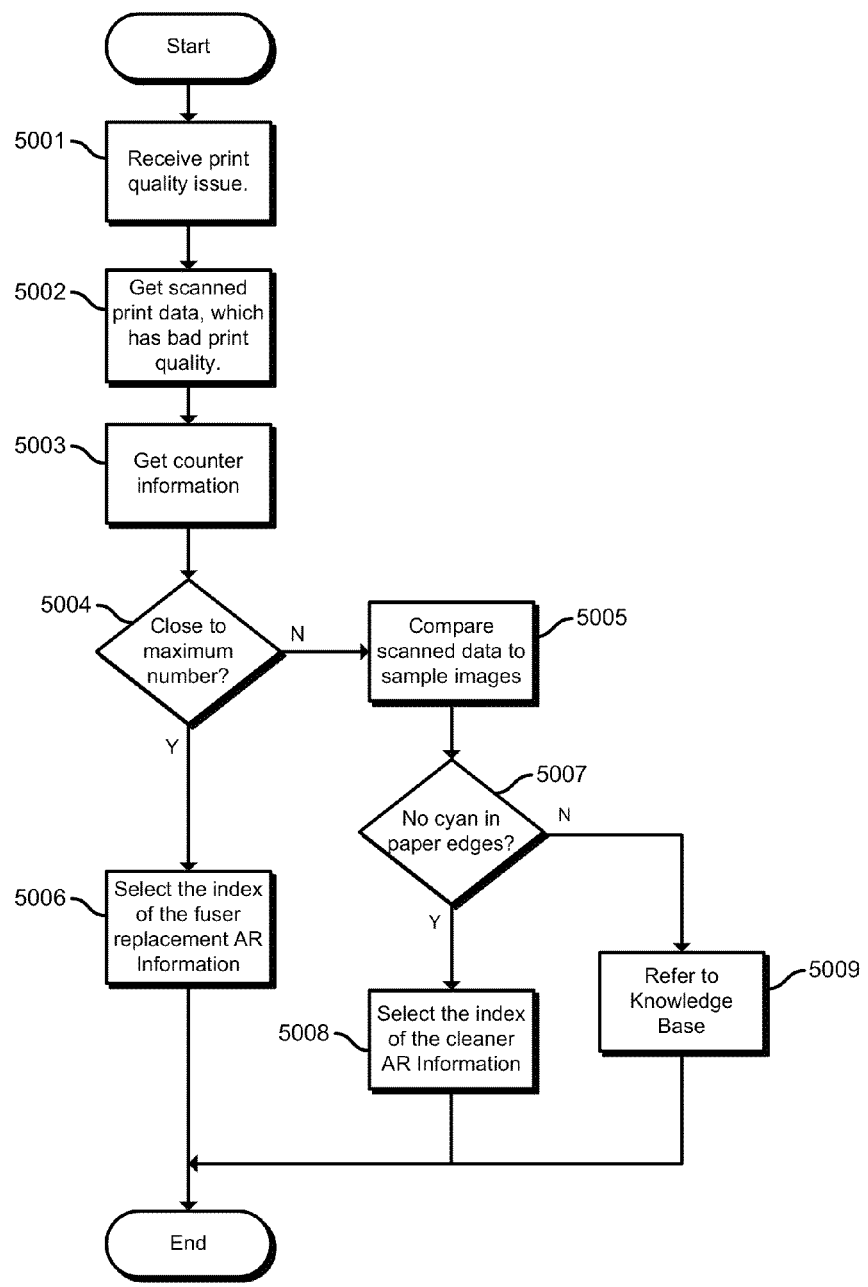
FIG. 5 illustrates an example embodiment of a method for identifying how to repair an error.

FIG. 5 illustrates an example embodiment of a method for identifying how to repair an error. The method may be performed at least in part by the device analyzing service 1011. FIG. 5 is another example of block 3003 in FIG. 3. This example describes how to select the AR index when the error, which is poor print quality, is received. When the device analyzing service 1011 receives an error indicating a print quality issue, the flow proceeds to block 5001. The device analyzing service 1011 may receive an error from the MFP 1000 via the device management service 1008. If the received error code indicates a print quality issue, in block 5002 the device analyzing service 1011 obtains scanned print data, which has bad print quality. Next, in block 5003, the device analyzing service 1011 also obtains counter information from the data base 1009 via the device management service 1008. The counter information may periodically be sent from the MFP 1000 to the device management service 1008, and the data base 1009 stores the counter information. If in block 5004 the counter value is close to a maximum number (e.g., 100,000), then block 5004=YES, and in block 5006 the device analyzing service 1011 determines that the fuser in the device must be changed. Also, the device analyzing service 1011 selects the AR index which corresponds to the AR information that guides a user to change the fuser, and then the flow ends.

If in block 5004 the device analyzing service 1011 determines that the current counter is not close to or has not exceeded a maximum number (block 5004=NO), the flow proceeds to block 5005, where the device analyzing service 1011 compares the scanned print data to sample images. Next, in block 5007, the device analyzing service 1011 determines if there is no cyan in the paper edges of the scanned print data. If no (block 5007=NO), the flow proceeds to block 5009, where the device analyzing service 1011 refers to the KB 1015. If yes (block 5007=YES), then the flow proceeds to block 5008, where the device analyzing service 1011 selects the AR index that corresponds to the AR information that guides the user to clean the scanning mirrors, and the device analyzing service 1011 notifies the AR service 1010 after selecting the AR index.

Figure 15:
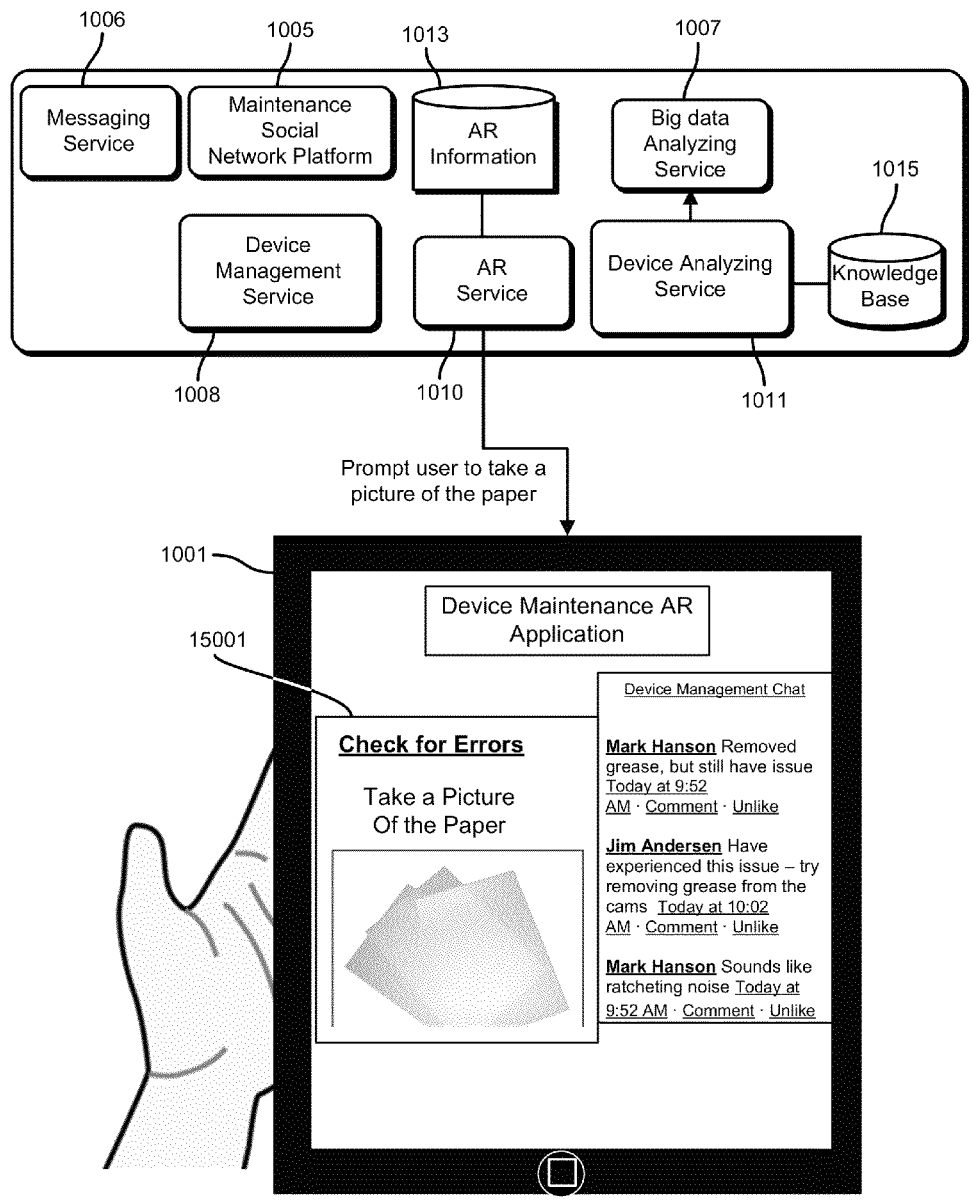
FIG. 15 illustrates an example embodiment of a system for servicing an image forming apparatus.
Figure 16:
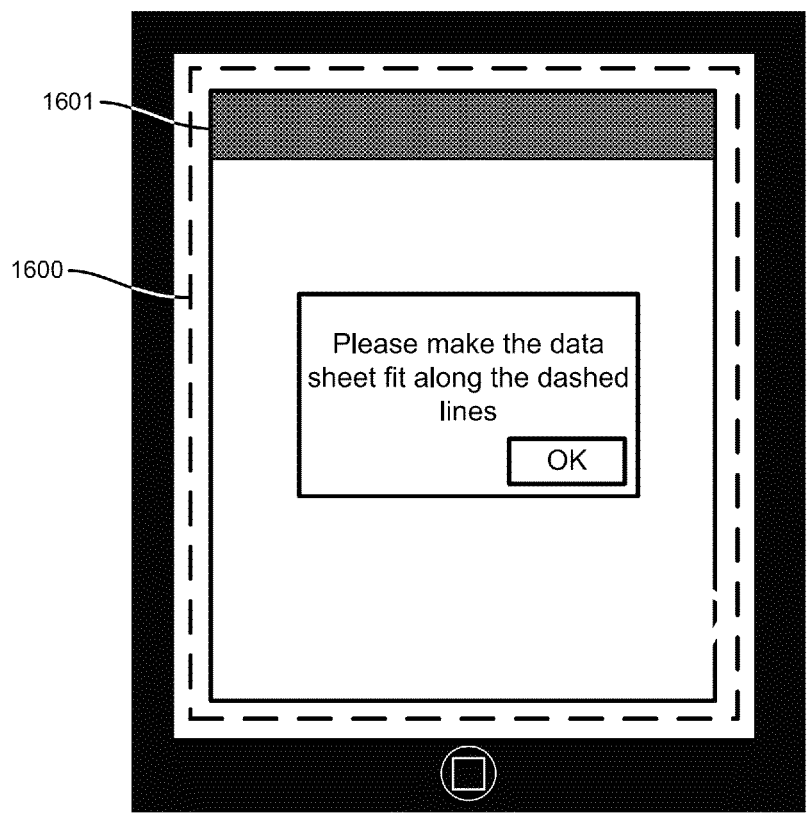
FIG. 16 illustrates an example embodiment of an interface for an AR mobile application.

To capture a scanned print data, for example, the AR information may instruct a user of the mobile device 1001 to capture one or more photographs. In some embodiments, the AR information guides a user to operate the MFP 1000 to print a paper (e.g., a test paper) and guides the user to scan the paper or take a photograph of the test paper. As shown in FIG. 15, which illustrates an example embodiment of a system for servicing an image forming apparatus, after a user mobile application in the mobile device 1001 receives the AR information, the mobile device 1001 displays the AR guidance, for example as shown in the display of the mobile device 1001. The AR guidance instructs the user/service technician to take a picture of the paper output from the MFP 1000, as shown in FIG. 15 and FIG. 16. The AR guidance (which may be superimposed over a live view of an image from a camera of the mobile device 1001) prompts the user to fit the edges of a sheet along dashed lines 1600 so that the device analyzing service 1011 can perform the appropriate image recognition process. After capturing the image, the user mobile application may automatically send the captured image(s) of the printed sheet (e.g., the scanned print data) to the device management service 1008, and then the captured image is passed to the device analyzing service 1011.

Figure 17A:
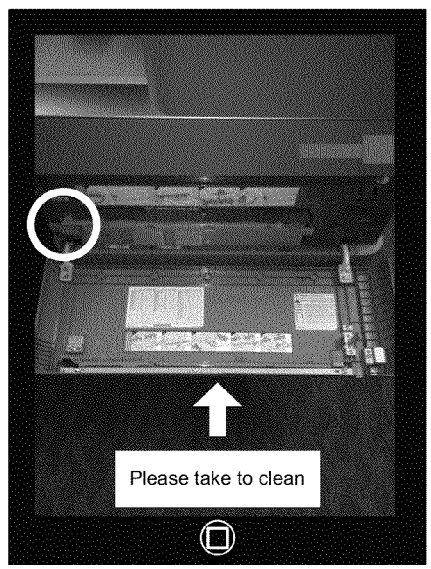
FIG. 17A illustrates an example embodiment of an interface for an AR mobile application.
Figure 17B:
FIG. 17B illustrates an example embodiment of an interface for an AR mobile application.

The device analyzing service 1011 compares the captured image of the printed sheet to sample images. If the device analyzing service 1011 determines that the edges of paper are colored by cyan (block 5007=YES), for example as shown in 1601 of FIG. 16, the device analyzing service 1011 determines that cleaning for the mirror is necessary for the MFP 1000. Then the device analyzing service 1011 specify the appropriate AR index and sends it to AR service 1010. The AR service 1010 obtains the corresponding AR information, which includes AR guidance, and sends it to the mobile device 1001 (e.g., in block 5008). The mobile device 1001 displays the AR guidance, which shows how to locate the cleaner (FIG. 17A) and how to clean the mirror (FIG. 17B). If the edges of the paper are not colored by cyan (block 5007=NO), the device analyzing service 1011 refers to the KB 1015 (e.g., in block 5009).

Figure 6:
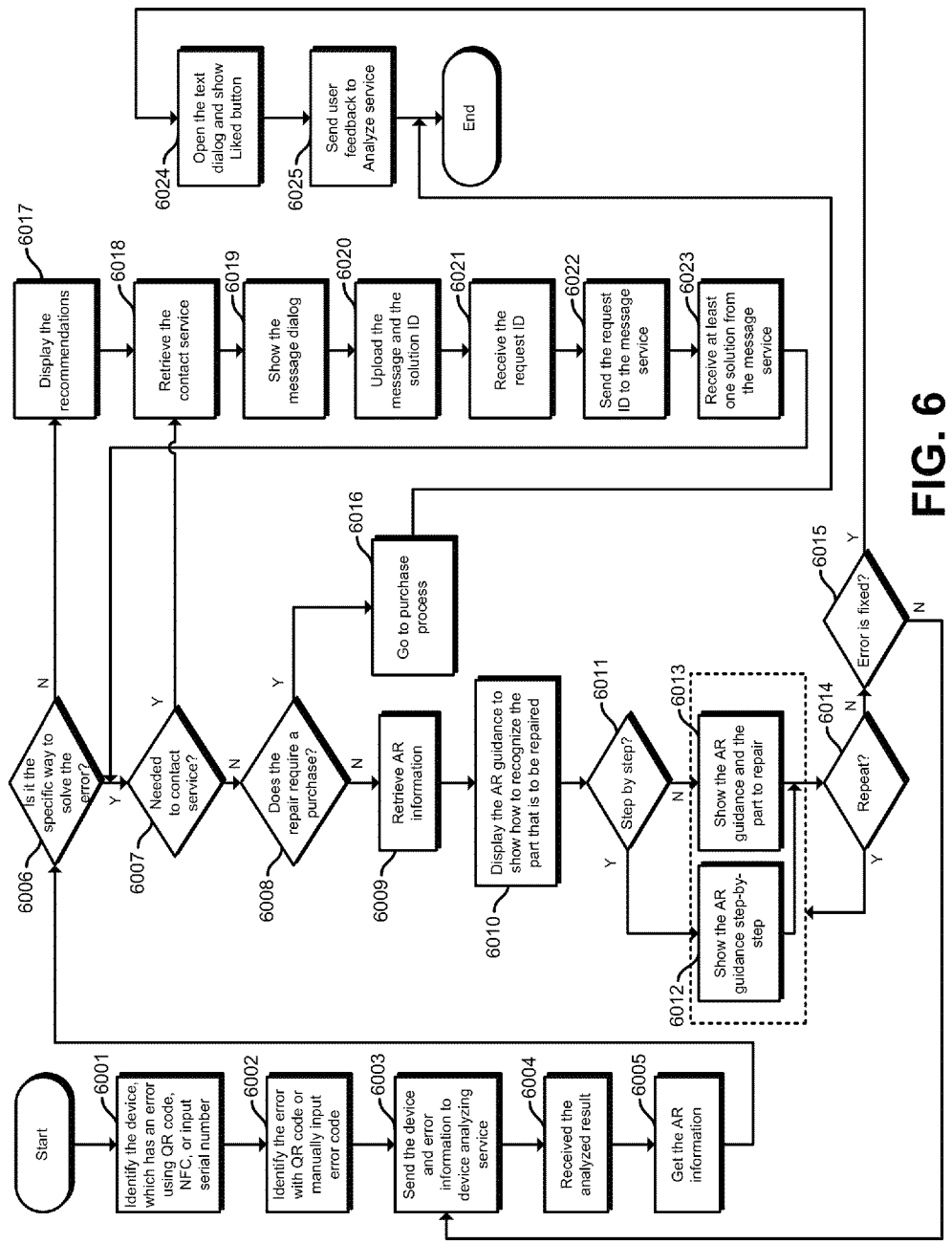
FIG. 6 illustrates an example embodiment of a method for displaying AR information.

FIG. 6 illustrates an example embodiment of a method for displaying AR information. When the user mobile application is instructed to start, the flow starts. In block 6001, the user mobile application identifies the MFP 1000 to that has an error. For example, the user mobile application may acquire the identification information of the MFP 1000 based on a QR code that is displayed on the MFP 1000 and is captured by a camera of the mobile device 1001, by using NFC communication, or based on a serial number that was displayed on an operation panel of the MFP 1000 and that was manually input via an I/O unit of the mobile device 1001. In block 6002, the mobile application identifies the error based on the QR code and/or an error code that was input manually (which may have been displayed on the MFP 1000 operation panel or may have been transmitted to the mobile device 1001 via NFC). The user mobile application sends the device information of the MFP 1000, the identified error(s) of the MFP 1000, and other error information to the device analyzing service 1011, in block 6003. In block 6004, the user mobile application receives the analyzed result from the device analyzing service 1011. In block 6005, the user mobile application gets the recommended solutions, including the AR indexes, from the AR service 1010.

If the solution includes the specific way to solve the error (block 6006=YES), then in block 6007 the user mobile application asks the user whether or not the user needs to contact the service center. If the input from the user indicates that the contact with the service center is not needed (block 6007=NO), the user mobile application checks whether or not the purchase process is required at block 6008.

If the user mobile application determines the purchase process is needed (block 6008=YES), the flow proceeds to block 6016, where the user mobile application accesses a web site to order the parts. If the user mobile application does not determine that the purchase process is needed (block 6008=NO), the flow proceeds to block 6009, where the user mobile application retrieves the AR information. Then, in block 6010, the user mobile application displays the AR guidance to show the user how to recognize the part to be repaired. And in block 6011 the user mobile application may wait for the user's input to select whether to show a step-by-step AR guidance (e.g., a video and modeling data that prompts the user before transitioning to a next segment) or continuous AR guidance (e.g., a video and modeling data that plays without waiting for user input).

If the application obtains the input that indicates the step-by-step AR guidance (block 6011=YES), then in block 6012 the AR guidance is displayed step-by-step on the display of the mobile device 1001. The user may interact with a UI of the user mobile application to move forward the next step, for example by pushing the button after he changes the part on the MFP 1000. If the step-by-step AR guidance is not selected (block 6011=NO), then in block 6013 the streaming AR guidance will be sent from the AR service 1010 to the mobile device 1001. Next, the flow arrives at block 6014, where the user mobile application determines if the AR guidance is to be displayed again. When an input indicating a repeat is received (block 6014=YES), the AR service 1010 and/or the user mobile application replays the AR guidance.

If a repeat is not to be played, then the flow proceeds to block 6015, where the user mobile application determines whether the occurred error has been fixed or not. If the MFP 1000 still has an error (block 3015=NO), for example has another error even though the error was fixed or the error was not fixed, the flow returns to block 6003, where the error information is sent to the device analyzing service 1011 via the device management service 1008. When the user mobile application determines that the error has been fixed (block 6015=YES), the flow proceeds to block 6024, where the user mobile application opens the text dialog and shows the "Liked" button. The user input in a message typed in the text dialog and/or in the push of "Liked" or the "Dislike" button is received in block 6024. Next, in block 6025 the feedback is sent to the maintenance social network platform 1005, and then the flow ends.

If in block 6006 the user mobile application found there is not a specific solution to the error (block 6006=NO), then in block 6017 the user mobile application displays the recommended solutions that were received from the recommendation service 1012. Next, in block 6018, the user mobile application retrieves the service contact information from the customer information (which, for example, may be in the customers data base in the data base 1009) maintained by the device management service 1008. Then in block 6019, the user mobile application shows the message dialog. A message typed by the user is sent to the messaging service 1006 in block 6020, where the user mobile application uploads the message and the solution ID from the messaging service 1006. In block 6021 the user mobile application receives the request ID, for example via the messaging service 1006. Next, in block 6022 the user mobile application sends the request ID to the message service 1006. Following, in block 6023, the user mobile application receives at least one solution from the message service 1006, and then the flow proceeds to block 6007.

Figure 7:
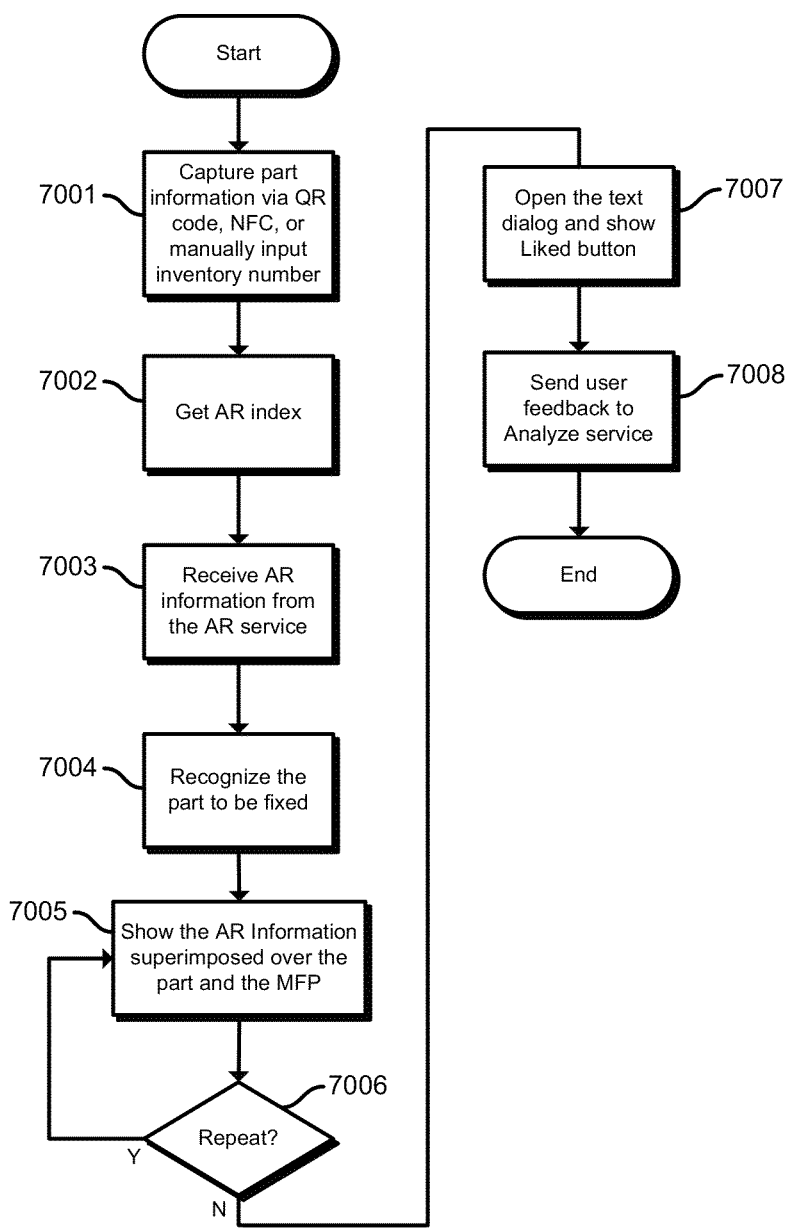
FIG. 7 illustrates an example embodiment of a method for displaying AR information.

FIG. 7 illustrates an example embodiment of a method for displaying AR information. Also, the user may have the replacement part. After the flow starts, in block 7001, when the part of the MFP 1000 that is to be fixed or replaced is recognized, the user mobile application acquires the part information via a QR code, NFC, or a manually input inventory number. In block 7002 the user mobile application gets the AR index and, in block 7003, receives the AR video from the AR service. In block 7004 the user mobile application recognizes the part to be fixed, and in block 7005 the user mobile application shows the AR information superimposed over the part to be fixed and the MFP.

For example, in block 7001 to 7005, the user mobile application recognizes the part to be fixed by using the captured QR code, which includes an error code. The user mobile application sends the recognized error code to the device analyzing service 1011, and the device analyzing service 1011 identifies the AR index of the corresponding AR information and sends the AR index to the AR service 1010. The AR service 1010 sends the AR information that corresponds to the AR index to the user mobile application, and the user mobile application displays the AR information (which illustrates how the fix the part) that was received from the AR service 1010. The AR information may be overlaid/superimposed on an image of the part that is to be fixed.

If it is determined that the AR guidance needs to be replayed (block 7006=YES), the user mobile application repeats the display of the AR information (block 7005). If replay is not needed (block 7006=NO), then in block 7007 the user mobile application opens the text dialog and shows the "Liked" button, and the user mobile application obtains messages typed by the user and obtains the input of the "Liked" or "Disliked" button. Finally, in block 7008 the feedback is sent to the maintenance social network platform 1005, and then the flow ends.

Figure 8:
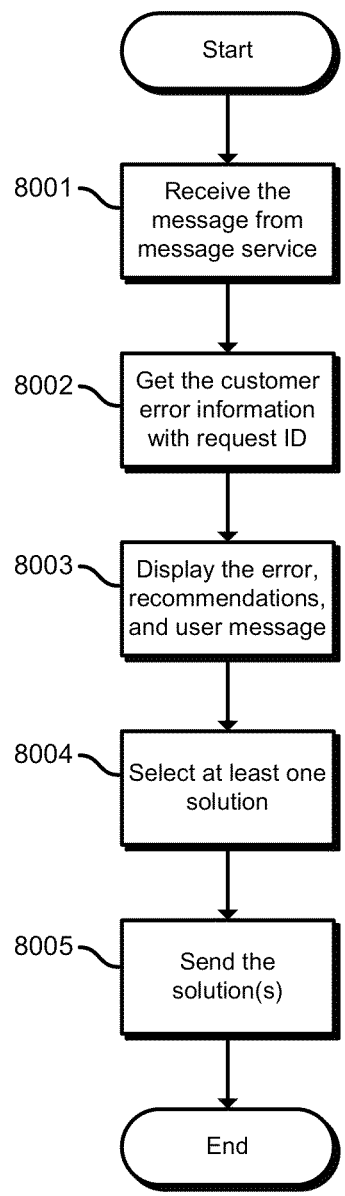
FIG. 8 illustrates an example embodiment of a method for selecting an error solution.

FIG. 8 illustrates an example embodiment of a method for selecting an error solution. The method may be performed at least in part by the service technician mobile application in FIG. 1D or the user mobile application shown in FIG. 1C. When the service technician mobile application begins to execute, the flow starts. In block 8001, the service technician mobile application receives the message from the message service (e.g., the message service 1006). Then the service technician mobile application gets the customer error information with the request ID in block 8002. Next, in block 8003, the service technician mobile application causes the display to present the error, any recommended solution(s), and the user message. In block 8004 the service technician mobile application receives at least one selection of a solution from a service technician. Finally, in block 8005 the service technician mobile application sends the solution to the messaging service 1006 and then the flow ends.

Figure 9:
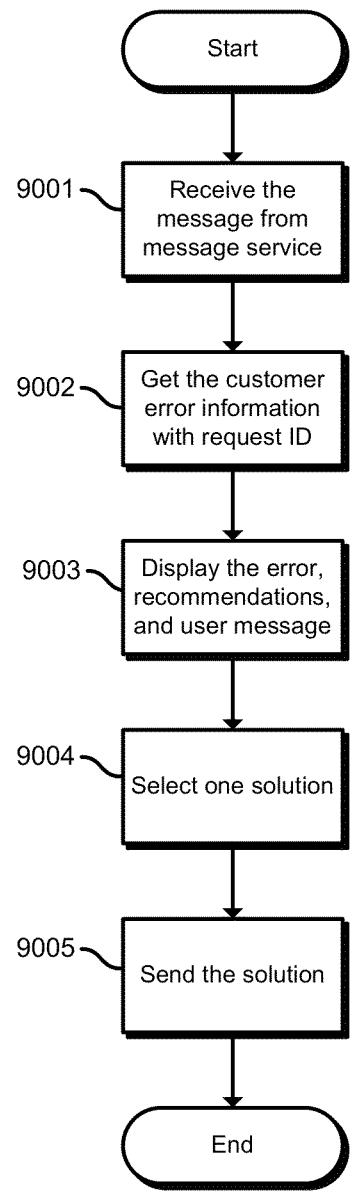
FIG. 9 illustrates an example embodiment of a method for selecting an error solution.

FIG. 9 illustrates an example embodiment of a method for selecting an error solution. The method may be performed at least in part by the user mobile application in FIG. 1C or the service technician mobile application in FIG. 1D. In block 9001, when the user mobile application uploads their message to the message service 1006 (e.g., the IM service), the service technician in the service center who supports the user receives the message from the message service 1006. In block 9002, the service technician mobile application gets the request ID and the error information. The service technician mobile application may retrieve customer error information with the request ID when the message is sent to the service technician mobile application from the messaging service 1006. Next, in block 9003, the service technician mobile application displays the error, the recommendations (e.g., recommended solutions), and the user message on the display of the service technician's mobile device (e.g., a cell phone). In block 9004, the service technician selects at least one solution from the recommendations, and the service technician application obtains the selection input. The selected solution is sent to the user mobile application via the messaging service 1006 (e.g., the IM service) in block 9005, and then the flow ends.

Figure 10:
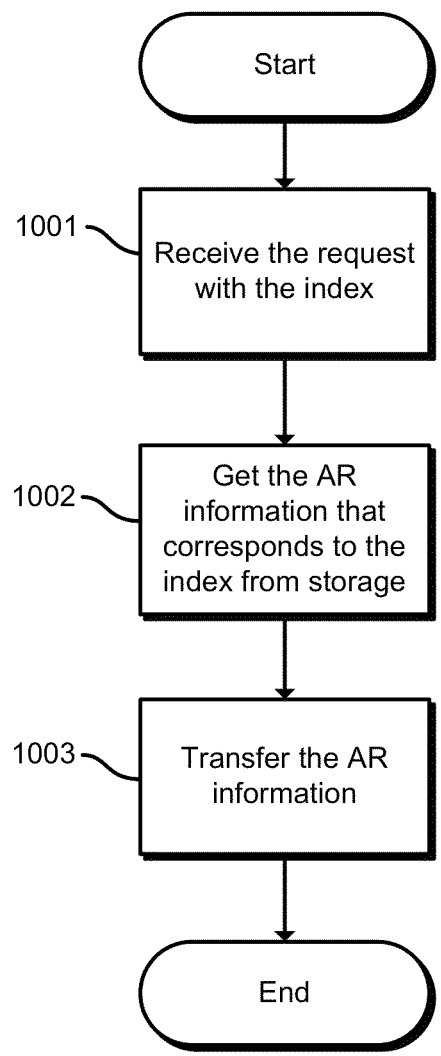
FIG. 10 illustrates an example embodiment of a method for obtaining AR information.

FIG. 10 illustrates an example embodiment of a method for obtaining AR information. The method may be performed at least in part by the AR service 1010. After the flow starts, in block 1001 the AR service 1010 receives a request, which has an AR index, for example from the device analyzing service 1011 or the user/service technician mobile application. Next, in block 1002, the AR service 1010 retrieves the AR information that corresponds to the index from storage (e.g., the database of AR information 1013), for example by using the received AR index. Finally, in block 1003, after finding and retrieving the AR information, the AR service 1010 transfers the AR information to the requesting user/service technician mobile application, and then the flow ends.

FIG. 11 illustrates an example embodiment of a system for servicing an image forming apparatus (e.g., an MFP 1000). In FIG. 11, a paper jam has occurred in the MFP 1000 and a user needs to fix it. After the user inputs the device serial number 1501 of the MFP 1000 into the user interface shown on the display 1505, the mobile device 1001 (e.g., phone, tablet PC) sends the serial number to the device management service 1008, and the device management service 1008 checks the MFP's error code(s), which may be managed according to the serial number. A chat window 1504 allows a user to input a message and send the message to the messaging service 1006.

The MFP 1000 sends the recognized error code to the device analyzing service 1011 via the device management service 1008, and the device analyzing service 1011 identifies the AR index that corresponds to the error code and sends the AR index to the AR service 1010. The AR service 1010 sends the AR information that corresponds to the AR index to the user mobile application in the user mobile device 1001.

Figure 12:
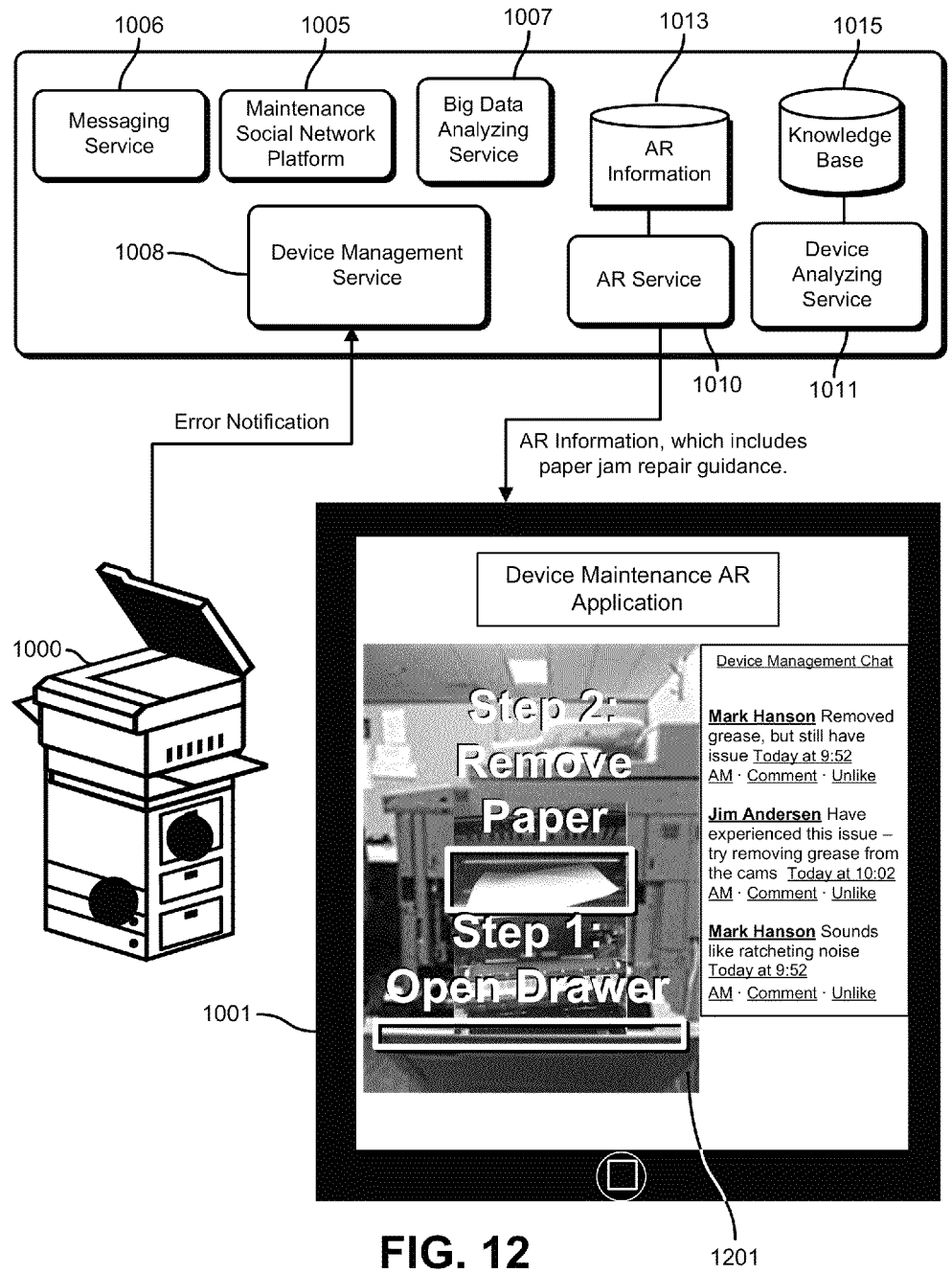
FIG. 12 illustrates an example embodiment of a system for servicing an image forming apparatus.
Figure 13:
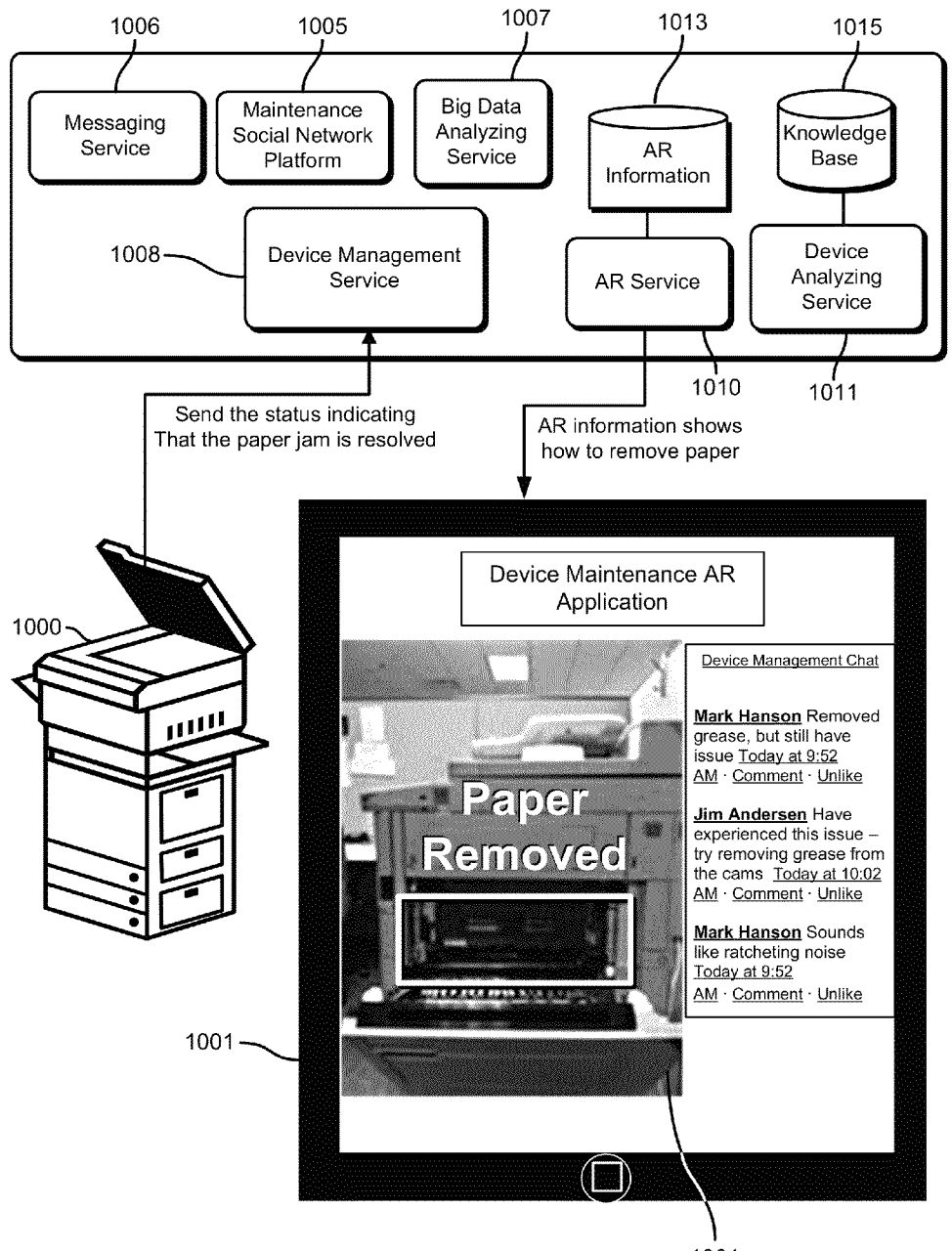
FIG. 13 illustrates an example embodiment of a system for servicing an image forming apparatus.

For example, FIG. 12, which illustrates an example embodiment of a system for servicing an image forming apparatus, shows a screen shot from the AR guidance 1201, which guides the user to remove the sheets of paper. The AR guidance 1201 (which is received from the AR service 1010) guides the user to open the drawer (step 1) and to remove paper (step 2). FIG. 13, which illustrates an example embodiment of a system for servicing an image forming apparatus, shows a screen shot of displayed AR information 1301 (which includes AR guidance superimposed over an image of the MFP) after removal of the paper, on the display of the user mobile device 1001. As shown in FIG. 13, the user mobile application displays a confirmation of the completion of the removal of the jammed paper.

Figure 14:
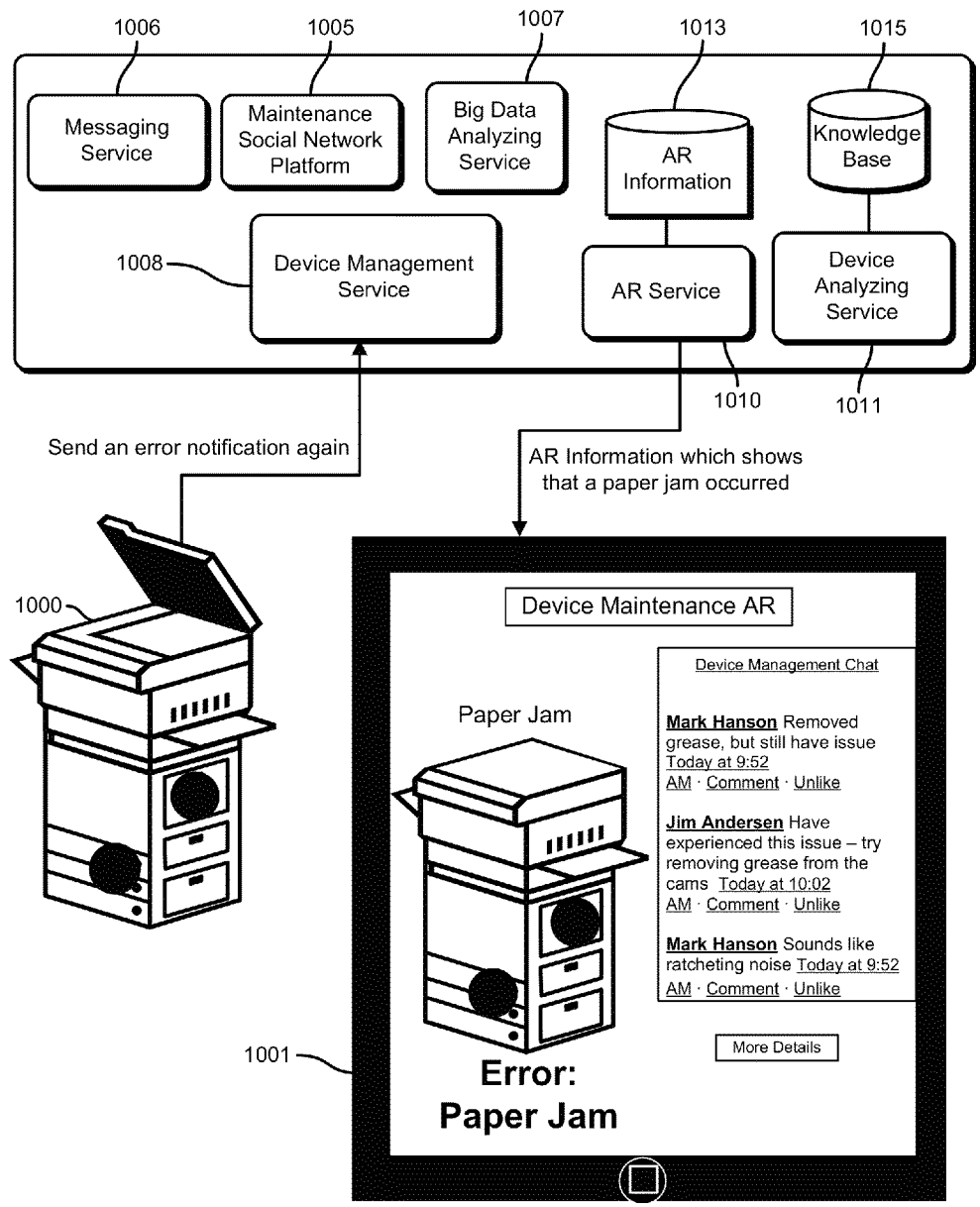
FIG. 14 illustrates an example embodiment of a system for servicing an image forming apparatus.

FIG. 14, which illustrates an example embodiment of a system for servicing an image forming apparatus, shows the AR information (e.g., AR guidance) that is presented to a user when sheets of paper are again jammed in the paper feed unit of the MFP 1000. A user may remove the sheets of paper according to the instructions in the AR information 1013. The status of the MFP 1000 is then changed in response to the removal of the paper, and the MFP 1000 sends the status to the device management service 1008. The device management service 1008 sends the updated status to the AR service 1010. The AR service 1010 may send other AR information to the user mobile application in response to receiving the updated status of the MFP 1000 via the device management service 1008 (for example, the AR information shown in FIG. 13).

Otherwise the user may need to remove the paper in another paper handling unit of the MFP 1000, if any. The flow may be repeated for each of the errors that occurred in the MFP 1000 to obtain the applicable AR information to help the user solve each of the errors.

When the user fixes the jam error, the user may try to operate the MFP 1000 to copy again. But sometimes the MFP 1000 has another jam error. If the device analyzing service 1011 determines that a predetermined number of errors have happened in a predetermined period of time, the device management service 1008 and/or the device analyzing service 1011 may select another AR index to provide a solution to the error.

The device management service 1008 recognizes many (over a predetermined number of) jam errors in the error history, which has been obtained by the device management service 1008. When the device analyzing service 1011 recognizes many (over predetermined number of) jam errors, the device analyzing service 1011 selects an AR index to fix the error. For example, the AR service 1010 selects the AR index of the applicable AR information that corresponds to the many jam errors.

Figure 19:
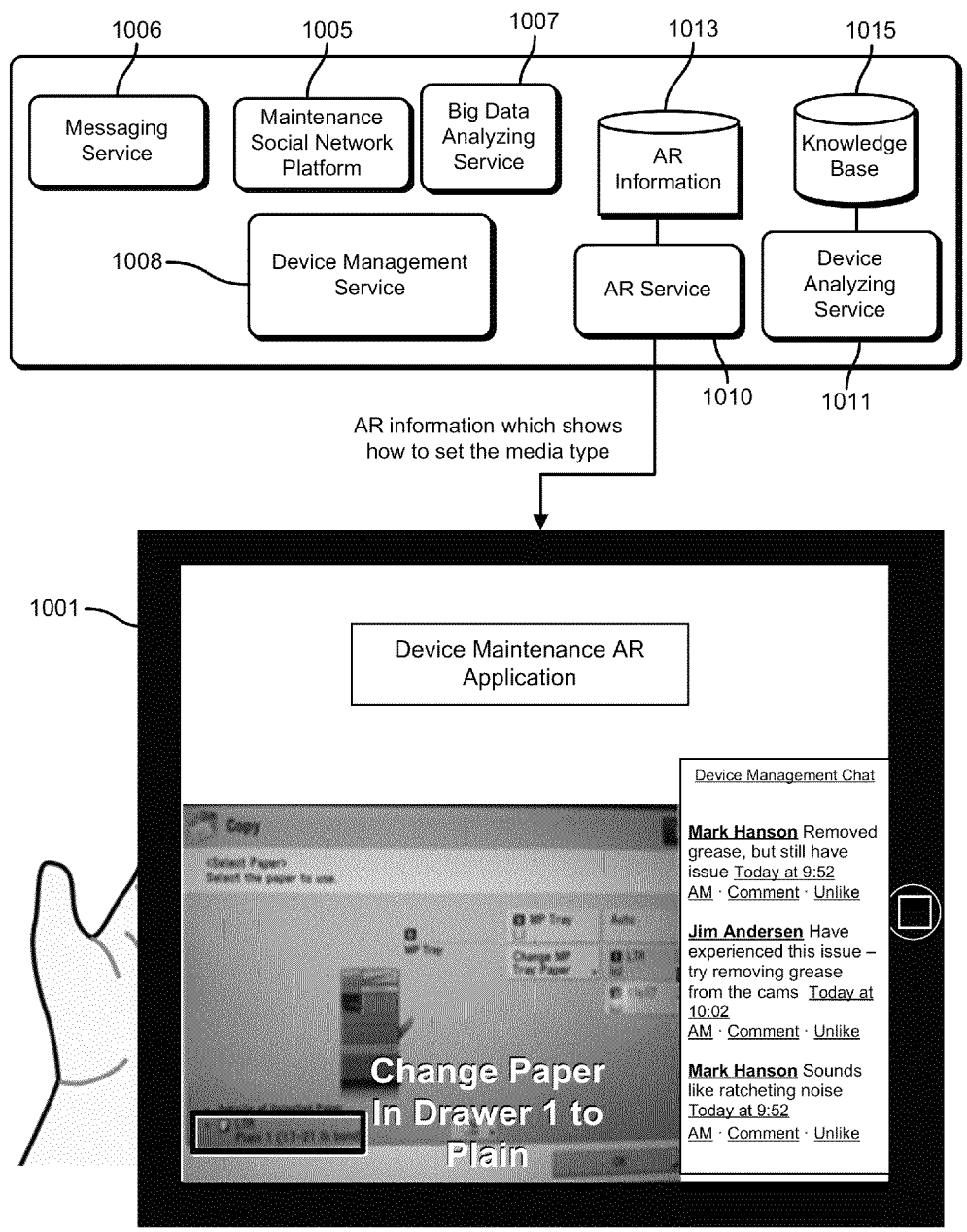
FIG. 19 illustrates an example embodiment of a system for servicing an image forming apparatus.

The AR service 1010 obtains the AR information, which guides the user to check whether or not thick paper is in a paper tray while the configuration in the MFP 1000 is set to use plain paper. If the user recognizes thick paper is in a paper tray while the configuration of the MFP 1000 is set to use plain paper, a user can input information indicating thick paper is in a paper tray while the configuration in the MFP 1000 is set to use plain paper. Then, if information indicating thick paper is in a paper tray while the configuration in the MFP 1000 is set to use plain paper is input or if the media detection unit detects that thick paper is in a paper tray while the configuration of the MFP 1000 is set to use plain paper, the AR guidance prompts the user whether the user wants to continue to use the current media type or not. If the user's input indicates the answer is "no," the AR guidance shows the user how to replace the sheets with the sheets of a different media type in the appropriate tray, for example as shown in FIG. 19. If the user's input indicates that the answer is "yes", the AR guidance shows the user how to change the configuration of the media type of the tray.

In response to the user changing the configuration of the tray, the MFP 1000 sends the change of configuration to the device management service 1008. The device management service 1008 notifies the AR service 1010 of the change of the configuration. Then the AR service 1010 notifies the user mobile device 1001 of the change in the configuration. The user mobile device 1001 then shows additional AR information, which indicates that the configuration change is successful, in response to receiving the updated configuration.

Also for example, the user checks the paper tray, and thick paper is in the drawer. The user needs to check the device configuration in the front panel of the MFP 1000. The user just pushes a button "Yes, the thick paper is used" on the display of the user mobile device 1001. The device analyzing service 1011 receives and analyzes the user interaction information from the mobile device 1001, such as the selection of "Yes, the thick paper is used." The device analyzing service 1011 determines the AR index of the AR information that shows how to configure the media type in the front panel. The device analyzing service 1011 sends the AR index to the AR service 1010, and the AR service 1010 sends the AR information to the user mobile device 1001. The user can check the configuration on the front panel based on the instructions in the AR information.

The user mobile device 1001 may also capture another photo of the front panel and send it to the device analyzing service 1011. Or the user mobile device 1001 may send "Yes, the media type in the device configuration is 'plain.'" The device analyzing service 1011 receives and analyzes the information that is received from the user mobile device 1001 and determines the AR index of the AR information that shows how to change the media type on the front panel. The user can change the configuration based on the instructions in the AR information. Finally, the user can fix the acute issue, which is a paper jam.

Figure 18:
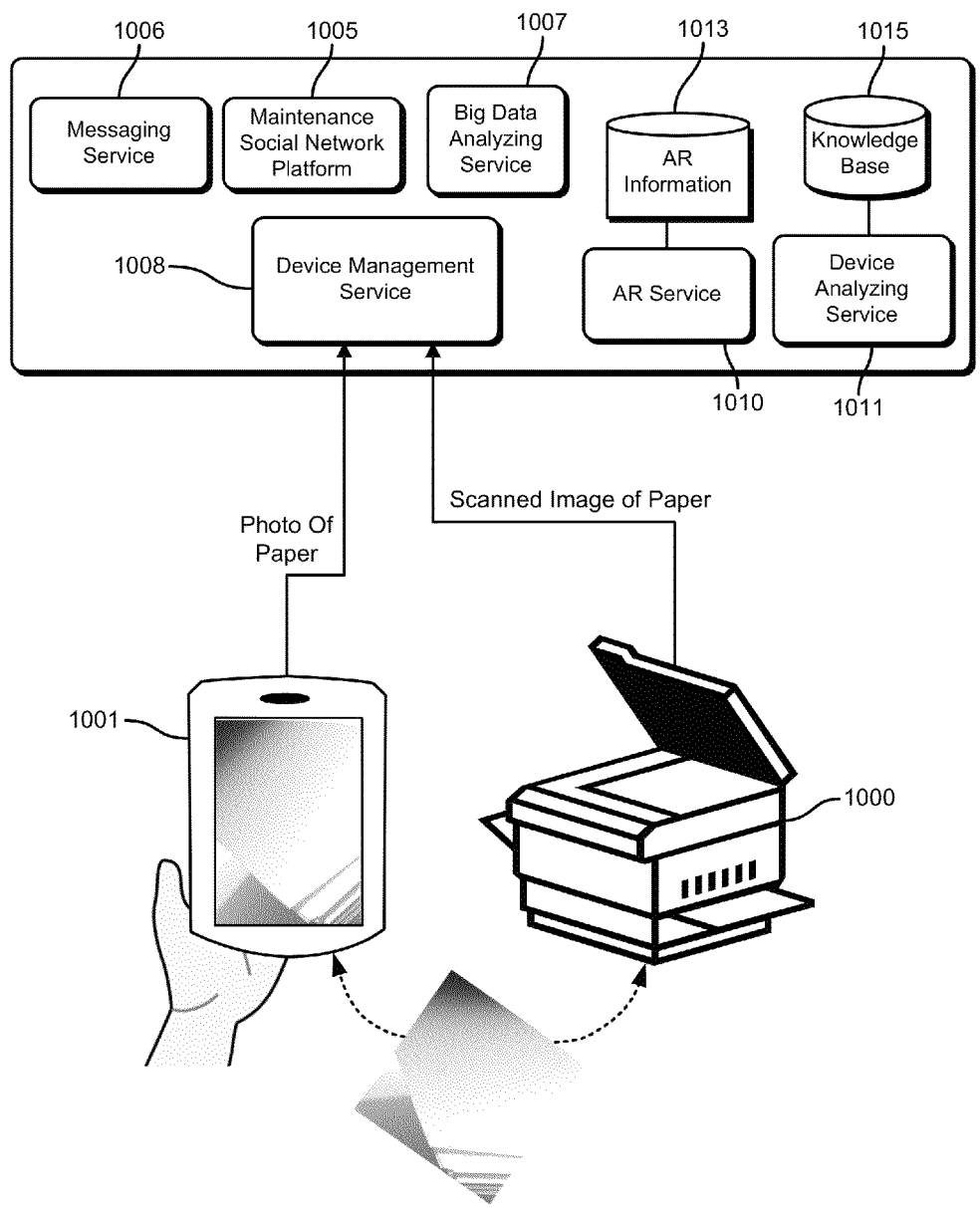
FIG. 18 illustrates an example embodiment of a system for servicing an image forming apparatus.

If the device analyzing service 1011 determines that there are print quality issues, the AR guidance 15001 in FIG. 15 may guide the user to take a photo of the paper in the tray and send the captured photo to the device management service 1008. In FIG. 15, the AR guidance may show the user how to pick out sheets of paper in the tray of the MFP 1000 and guide the user to take an appropriate photo (e.g., with the mobile device 1001), which will be used to determine the reason for the print quality issues. As indicated in FIG. 18, the mobile device 1001 may capture photo of the paper or a scanner in the MFP 1000 may scan the paper on a platen. Also, AR information may guide the user to operate the scanner of the MFP 1000. When the device management service 1008 receives the scanned image from the MFP 1000 or the photo from the mobile device 1001, the device management service 1008 sends it to the device analyzing service 1011. The device analyzing service 1011 checks whether the captured image is related to predetermined quality issues. If the device analyzing service 1011 determines the captured image is related to a predetermined quality issue, it obtains the AR index that corresponds to the AR information that provides the user the solution. The AR index is sent to the AR service 1010, and the AR service 1010 sends the AR information (see, e.g., FIG. 20 to FIG. 22) to the user mobile device 1001.

Figure 20:
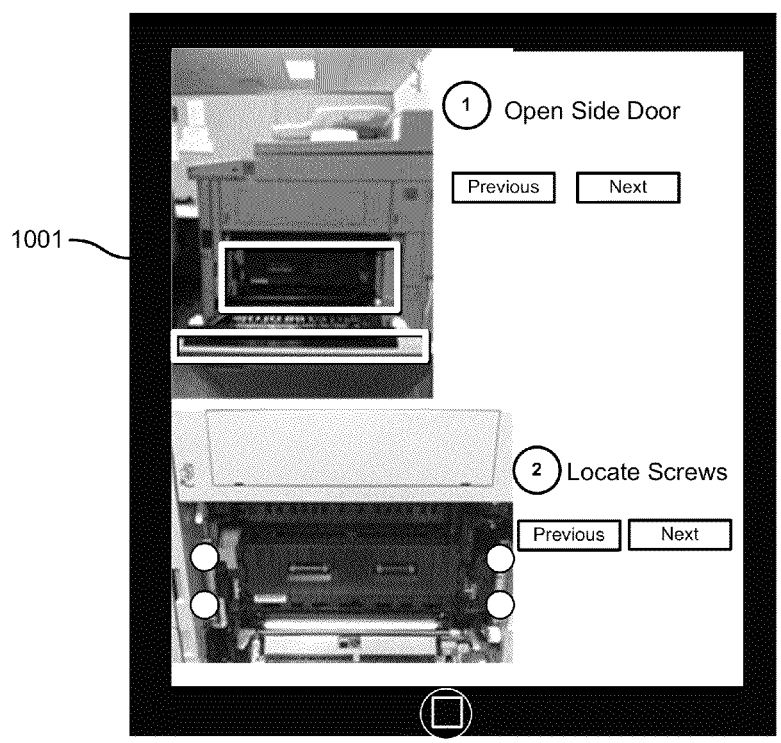
FIG. 20 illustrates an example embodiment of an interface for a user mobile application.
Figure 21:
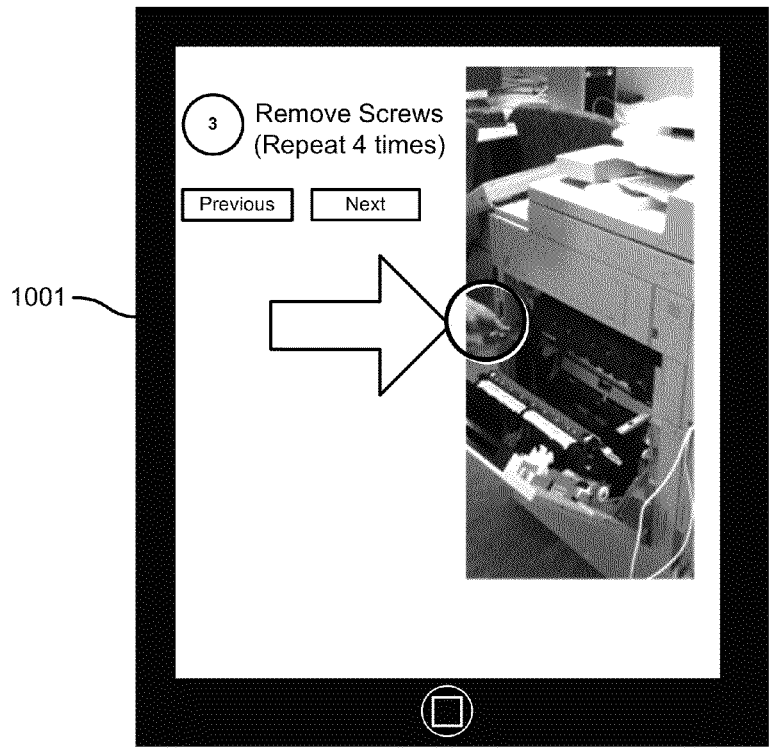
FIG. 21 illustrates an example embodiment of an interface for a user mobile application.
Figure 22:
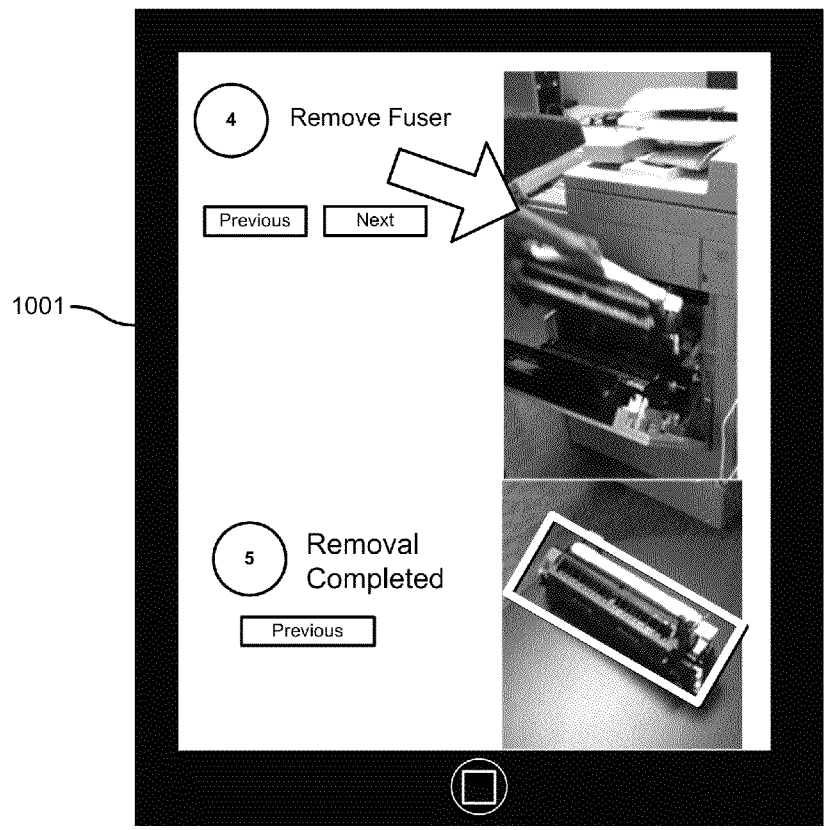
FIG. 22 illustrates an example embodiment of an interface for a user mobile application.

FIG. 20, FIG. 21, and FIG. 22 illustrate example embodiments of interfaces for a user mobile application. These examples illustrate AR guidance that shows how to change a fuser. The FIG. 20 interface, which is displayed on a user mobile device 1001, includes AR information that indicates how to open the side door (step 1) of an MFP 1000 and how to locate the screws of the fuser (step 2). In FIG. 21, the interface shows AR guidance, which was included in received AR information, that shows how to remove the screws of the fuser (step 3). In FIG. 22, the interface includes AR guidance that guides the user to remove the fuser (step 4) and confirms the completion of the removal with the user (step 5).

Also for example, an MFP 1000 displays Error#001, which indicates an error in the puncher unit. In response, an AR video (or other AR information) is selected that shows how to reconnect the serial cable of the puncher unit, how to plug it in to the main body of the MFP 1000, and/or how to turn the puncher unit on or off.

After Error#001 is repaired, next the MFP 1000 displays Error#002. The Error#002 indicates an error in the developer unit, which means that if the developer unit is connected properly, it should be replaced or the toner cartridges should be changed. An AR video is selected that shows how to install a new toner bottle in the device or how to plug in the developer unit cable.

After Error#002 is repaired, the MFP 1000 displays Error#003. This error indicates that an error in the POD paper deck feed motor. The selected AR video shows how to turn the POD deck on/off, how to connect the connector to the motor from the paper deck's controller board, how to replace the feed motor, and/or how to replace the paper deck's controller board.

Additionally, in some embodiments cyber-physical monitoring sensors in an MFP 1000 identify a failure and automatically notify a cloud-based maintenance management system. Maintenance management software can then initiate a remote diagnostic procedure in equipment to determine if a repair visit by a service technician is necessary. A self-repair program can also be transmitted to the system, or the customer can be emailed a repair procedure with a web-link to an instructional video. Repair parts that will likely be needed may be auto-ordered for delivery to the service technician, whose service call is appropriately auto-scheduled to align with an estimated receipt of parts. If parts are sent to a customer, a QR-code on the packaging can link to AR guidance that can be viewed on a mobile device.

The service technician may be directed to the street address where the MFP 1000 is located with a combination of GPS guidance and location information that is visible through an augmented reality browser in a mobile device. Once inside a customer building, indoor navigation technologies can guide the service technician to the specific machine needing/requesting repair.

An analytic summary of the machine's operating history is served from the cloud-based maintenance management system to the service technician's mobile device to aid the repair diagnosis. Analytical information may be categorized for three different levels of authorized access: 1) employees—equipment's technical operating history, 2) dealer—consumables history and equipment utilization, 3) customer—all information in 1) and 2), plus specific user usage data.

A service technician may use augmented reality (AR) software on a mobile device to visually overlay a step-by-step repair procedure onto the equipment, from the perspective as seen in front of the service technician. AR software may identify each part or wire in a cable bundle, along with its routing. AR software may provide an artificial "X-Ray" view of equipment by overlaying an in-perspective graphic of a cut-away view. Visual markers/stickers inside the machine may improve the quality and accuracy of an AR experience that relies on the low-end sensors used in some smartphones and tablets by providing a "spatial reference" for an AR overlay layer. Repair procedure videos and documentation could also be accessed by a service technician via the mobile device.

When an unexpected problem is encountered during a repair, the service technician may request real-time assistance from fellow servicemen through a dedicated maintenance network. Videos and photographs of the unexpected problem can be included with the real-time help/assistance request.

Once a repair is completed, the service technician can wirelessly test the equipment's print capability from his mobile device and print a service summary report for the customer. A service technician may share the newly devised repair procedure for the unexpected problem by posting the procedure to the maintenance network, along with photos and videos. This new procedure and its associated video may be auto-tagged for easy discovery by fellow servicemen who are searching for help with the same unexpected problem.

Also, AR-based repair procedures may be generated for customers to perform their own advanced maintenance or repairs. By tabulating cyber-sensor data from all installed equipment, analytics can be created to 1) Determine the frequency and duration of each repair type, 2) Link unusual failure counts to specific vendor parts, and 3) Predict failures based on data from machines that have failed. Augmented Reality glasses can be substituted for handheld mobile devices to provide a hands-free experience for a service technician.

Figure 25:
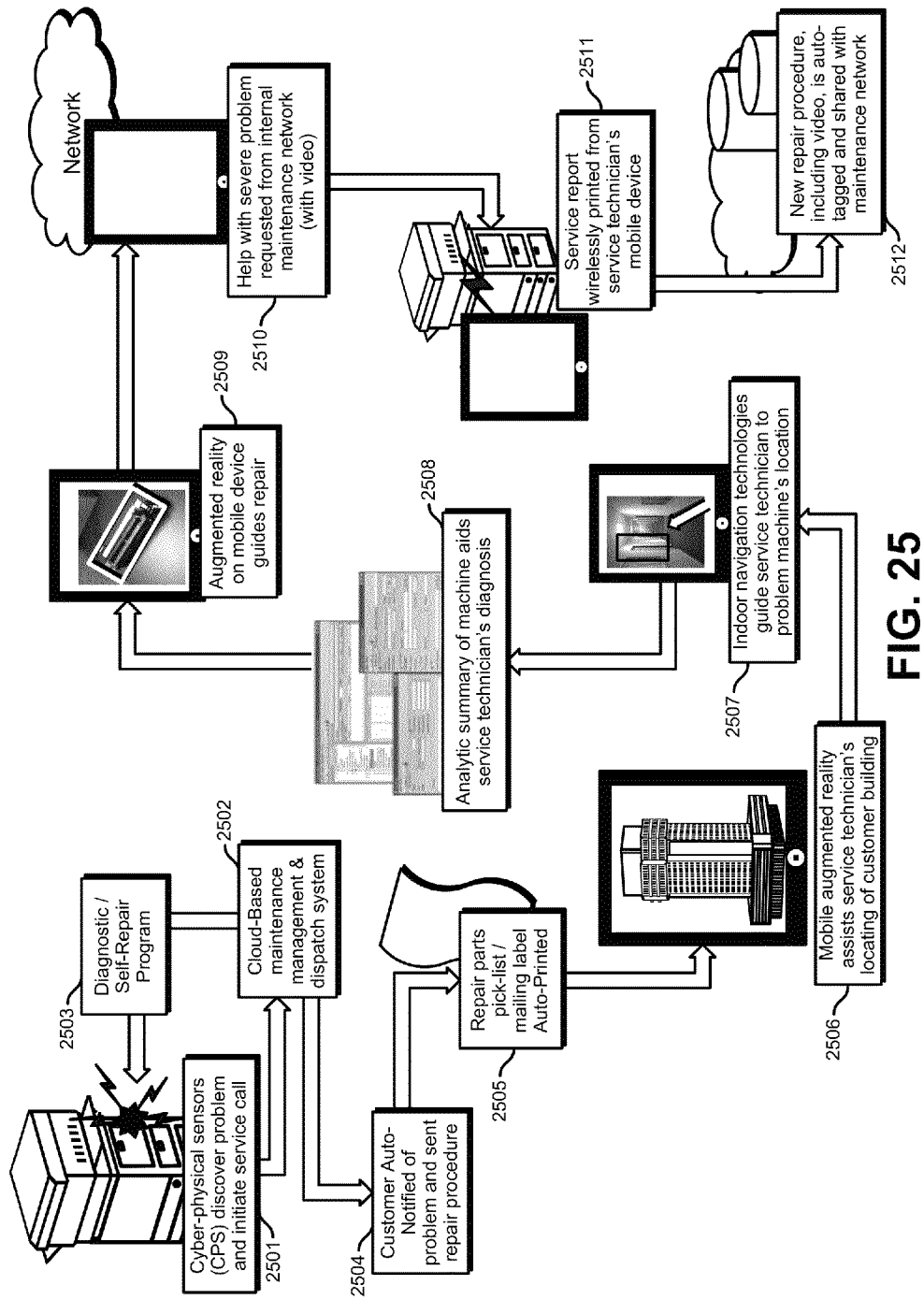
FIG. 25 illustrates an example embodiment an overview of a service call using a system for servicing an image forming apparatus.

FIG. 25 illustrates an example embodiment of an overview of a service call using a system for servicing an image forming apparatus. The system includes multi-sensor-equipped systems that report data over their dedicated network connections. Centralized, cloud-based software collects analytic data to generate actionable results, and augmented reality capabilities are delivered through mobile devices (e.g., smart phones and tablet devices). Indoor navigation technologies may be available where GPS signals are unavailable. Furthermore, exclusive enterprise networks integrate real-time communication, collaboration, and social capabilities. The system also has a wireless printing function.

In stage 2501, cyber-physical sensors in an MFP discover a problem and initiate a service call. In stage 2502, a cloud-based maintenance management and dispatch system determines if a self-repair program can resolve the problem. If yes, then in stage 2503 the diagnostic/self-repair program is sent to the MFP. In not, then in stage 2504, the customer (e.g., owner/operator of the MFP) is auto-notified of the problem and is sent a repair procedure. Next, in stage 2505, a list of repair parts is selected and a mailing label is automatically printed. Then in stage 2506, mobile augmented reality assists a service technician's locating of the customer's building. In stage 2507, indoor navigating technologies guide the service technician to the MFP's location.

Following, in stage 2508, an analytic summary of the MFP aids the service technician's diagnosis of the problem. In stage 2509, augmented reality on the mobile device guides the repair. If the problem is severe, in stage 2510 help is requested from an internal maintenance network. When the repair is completed, in stage 2511 the service report is wireless sent to the MFP from the service technician's mobile device and printed. Also, if a new repair procedure is used, then in stage 2512 the new repair procedure is automatically tagged and shared with the maintenance network.

Figure 26:
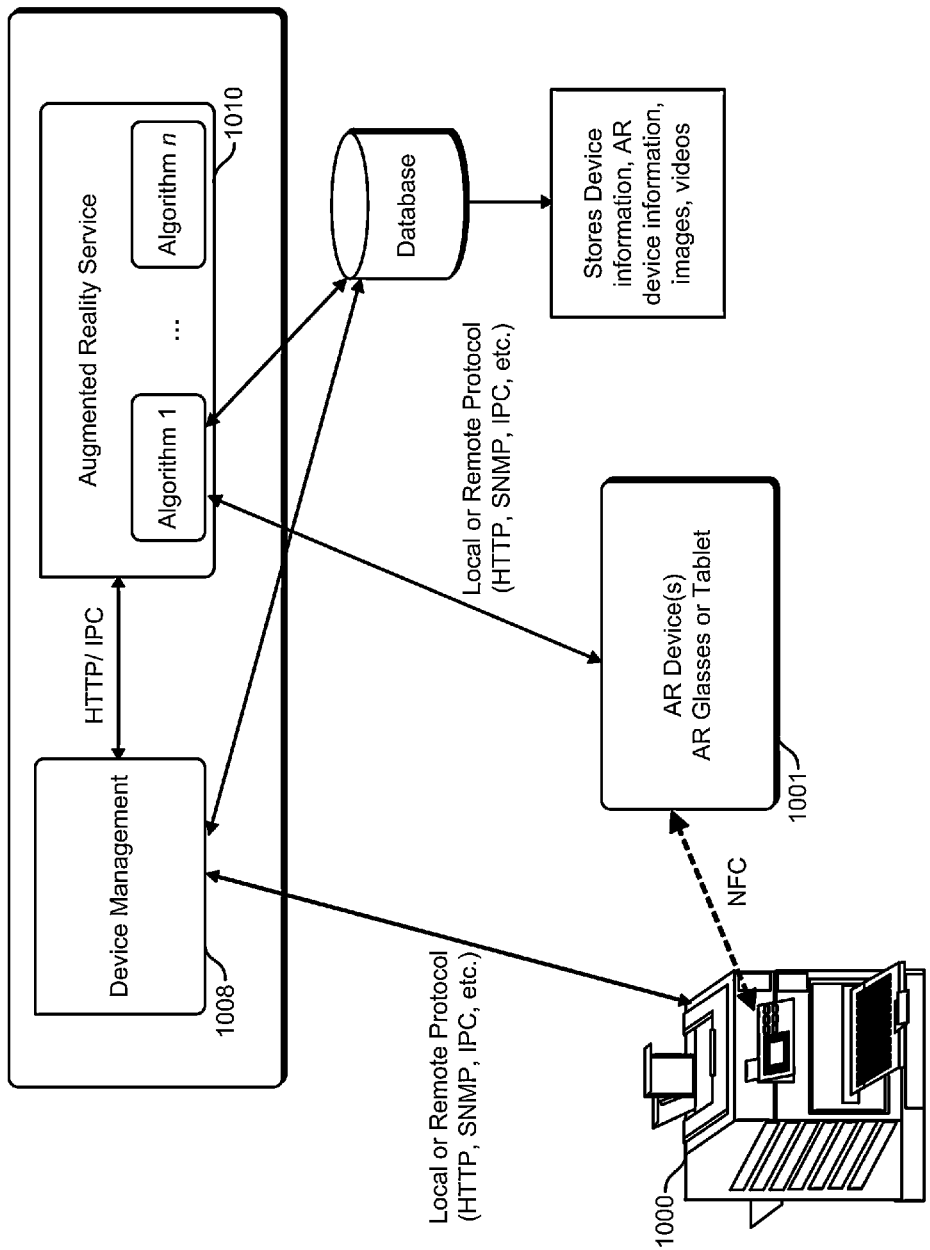
FIG. 26 illustrates an example embodiment of a system for servicing an image forming apparatus.

FIG. 26 illustrates an example embodiment of a system for servicing an image forming apparatus. Also, the embodiment of FIG. 26 includes dynamic device management with augmented reality and performs the troubleshooting of the device via augmented reality. The system may also allow the user to help install additional features on the device, such as finishers, or replace existing options. The embodiment in FIG. 26 includes a device management service (DMS) 1008 and an augmented reality service (ARS) 1010.

The DMS 1008 manages the interaction with and the information about various image forming devices (e.g., MFP 1000), and the DMS 1008 and collects device information from various image forming devices (e.g., MFP 1000) based on different protocols (e.g., device protocols, remote network protocols), such as SNMP. The DMS 1008 also collects status information from the image forming devices (e.g., MFP 1000). For example, the DMS 1008 may get the status (which may be the most dynamic attribute) of the device whenever the status changes and may send that information, along with other device information, to the ARS 1010. In addition, the DMS 1008 may use these protocols to control the devices. Also, the DMS 1008 may either reside on the MFP 1000 or on a server (e.g., the DMS 1008 can run locally on the MFP 1000 or remotely from the MFP 1000).

The ARS 1010 communicates with the DMS 1008 to obtain information about the device or the status of the MFP 1000, and the ARS 1010 manages and communicates with the AR devices 1001, such as AR glasses (e.g., AR goggles) or a tablet. The communication channel between the ARS 1010 and the DMS 1008 may use various protocols, such as TCP, HTTP, etc. The ARS 1010 can also operate on the MFP 1000 or remotely to the MFP 1000. The ARS 1010 gets the device status and information, generates an AR image or video, and sends the AR image or video to the AR device 1001 (AR glasses, tablet). The images or the video feed to the AR device 1001 may be streamed in real-time based on the changes happening on the device. The ARS 1010 may generate an image/video based on one or more selected AR Algorithms (e.g., algorithm 1 to algorithm n) and on the AR device 1001 that will display the images/video. The ARS 1010 receives input from an interaction module that obtains information on the MFP 1000 status.

In FIG. 26, the MFP 1000 in the network needs monitoring, updates, and troubleshooting in a more efficient and seamless manner. The DMS 1008 with the AR system allows the user, whether a highly trained technician or a novice, to efficiently troubleshoot problems or install new options for the MFP 1000.

Following are two example situations that prompt a user to use the AR device 1001 at the MFP 1000. One situation occurs when the MFP 1000 malfunctions, and another situation occurs when the MFP 1000 needs an update or an upgrade of its current equipment.

Figure 27:
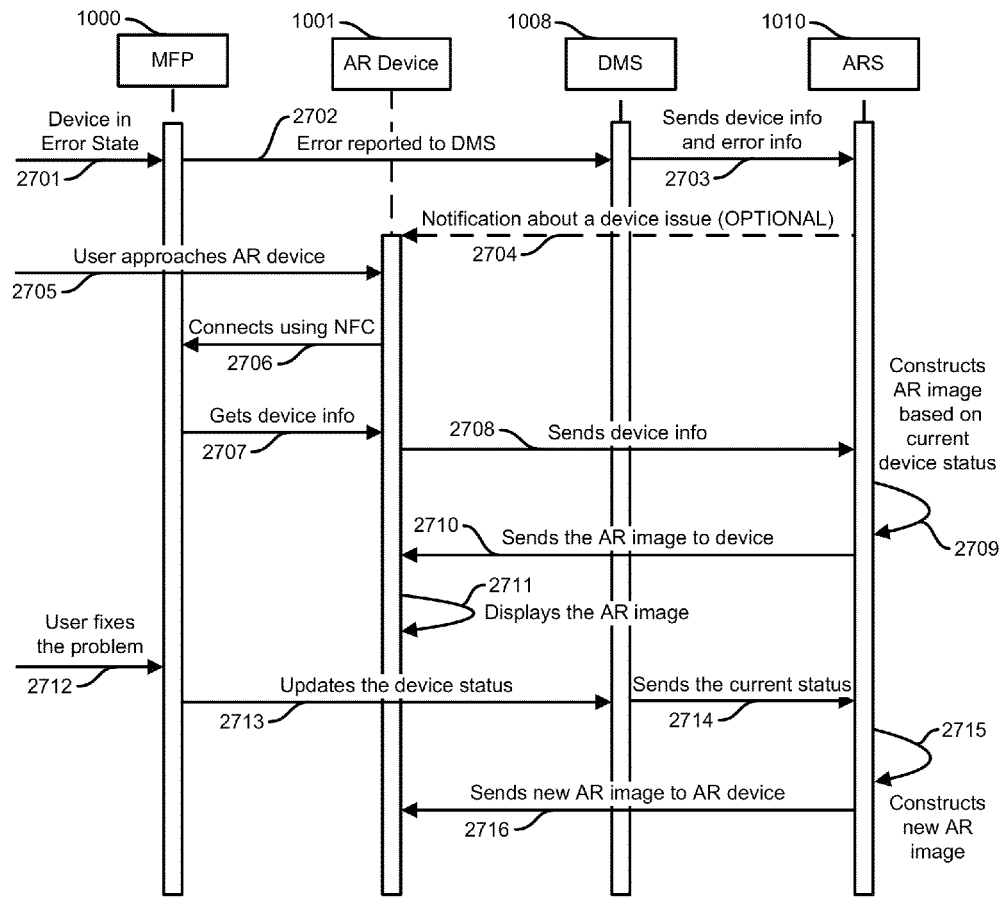
FIG. 27 illustrates an example embodiment of a method for providing a solution by AR guidance.

FIG. 27 illustrates an example embodiment of a method for providing a solution by AR guidance, and the flow of the method will be described in the context of a malfunction of the MFP 1000. In stage 2701, when a malfunction occurs the DMS 1008 obtains a notification about the problem. The DMS 1008 may obtain the notification via different mechanisms, such as polling the MFP 1000, or receiving a notification that was automatically sent from the MFP 1000. For example, if the DMS 1008 is running natively on the MFP 1000, the DMS 1008 and the other components of the MFP 1000 can use process calls or communicate with the firmware to transmit the status of the device, or the DMS 1008 may use other protocols (e.g., if the DMS 1008 is operating remotely from the MFP 1000).

Once the status is obtained by the DMS 1008 in stage 2702, the flow proceeds to stage 2703. In stage 2703, the DMS 1008 sends that information to a pre-configured ARS 1010 along with the MFP 1000 device information, which indicate where the problem occurred. The DMS 1008 can also store the static information about the device into the database for quick retrieval.

The communication between the DMS 1008 and ARS 1010 depends on where these services reside. If both resides on the same device (e.g., a server), than an inter-process communication may be used to communicate. But if the DMS 1008 and the ARS 1010 reside on different devices (e.g., the MFP 1000 and a server), then a remote communication protocol, such as HTTP or a direct TCP call, may be used to exchange the information between the modules.

After the ARS 1010 receives the status and the information about the MFP 1000 in stage 2703, in optional stage 2704, based on the system configuration the ARS 1010 may try to notify an AR device 1001 or a user about the MFP status. If there is no configuration setting for the notification, the ARS 1010 may store the information as pending in the database.

In stage 2705 the user or the service technician brings the AR device 1001 close to the MFP 1000 which has the problem, and in stage 2706 the AR device 1001 connects to the MFP 1000 using NFC (Near Field Communication), Bluetooth, a USB based connection, or any other supported near communication protocol. Once the AR device 1001 is connected the MFP 1000, in stage 2707 the AR device 1001 gets the device information from the MFP 1000, and in stage 2708 the AR device 1001 sends the information to the ARS 1010.

Next, in stage 2709 the ARS 1010 constructs an AR image or video based on the device information, the error, and or the selected AR algorithm(s). Then in stage 2710, the ARS 1010 sends the AR image/video to the AR device 1001, and in stage 2711 the AR device 1001 displays the AR image/video. The information that the ARS 1010 can use to construct the AR image includes the location of the MFP 1000, the distance between the AR device 1001 and the MFP 1000, etc.

Next, in stage 2712 the user/service technician implements the instructions in the AR image/video, and then in stage 2713 the MFP 10001) detects that the problem has been resolved or part of the problem has been resolved, and ii) updates the DMS 1008 with the status. In stage 2714 the ARS 1010 receives the update from DMS 1008, in stage 2715 the ARS 1010 creates a new AR image/video, and in stage 2716 the ARS 1010 sends the new AR image/video to the AR device. These stages may continue (repeat) until the problem is fixed and the MFP 1000 returns to a normal state.

If the MFP 1000 reports an error that requires multiple steps to fix it and if the MFP 1000 remains in that error state until the steps are completed, then the communication continues between the AR device 1001 and the ARS 1010. The ARS 1010 in turn obtains information from the DMS 1008 after each step is completed and generates the AR images/video for the next steps.

This system may also provide AR guidance for replacing existing parts or for adding additional parts/capabilities to a MFP 1000. In this scenario, the user has to start the process of replacing or adding the option to the MFP 1000. The user can start this by adding an application to the MFP 1000, which allows the user to select the option that is to be installed, or may start this through the AR device 1001. Once the option is selected by the user, the information is communicated to the DMS 1008, and then it the flow may be the same as or similar too stages 2701-2716.

As described above, the AR images/videos can be dynamically constructed based on the error code, and not based just on the physical appearance of the MFP 1000. Additional device models can be dynamically added to the system without updates to the MFP 1000 or the AR device 1001, for example by updating the DMS 1008 and/or the ARS 1010. Further, different AR algorithms can be used at the ARS 1010 based on the error criteria. Notifications can also be sent from the ARS 1010 to the AR device 1001 about a device problem. Even if multiple steps a required to resolve an error, a single user or service technician may perform the steps. Also, the system can provide guidance to install or update an option on the MFP 1000.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems and/or devices perform the operations of the above-described embodiments when executing the computer-executable instructions. Also, an operating system on the one or more systems and/or devices may implement the operations of the above described embodiments. Thus, the computer-executable instructions and/or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

The scope of the claims is not limited to the above-described embodiments and includes various modifications and equivalent arrangements.

What is claimed is:

1. An information processing apparatus configured to communicate with a client apparatus and an image forming apparatus, the information processing apparatus comprising:

a receiving unit configured to receive status information from an image forming apparatus;

a sending unit configured to send AR diagnostic information that includes AR guidance to a client apparatus, wherein the AR guidance includes instructions that describe how to operate the image forming apparatus to perform a diagnostic operation, wherein the AR information superimposes the AR guidance on an image captured by a client apparatus, and wherein the diagnostic operation is the printing of a sheet by the image forming apparatus;

an obtaining unit configured to obtain diagnostic information that was generated by the image forming apparatus when the image forming apparatus performed the diagnostic operation, wherein the diagnostic information includes an indication of an error that occurred in the image forming apparatus, and wherein the diagnostic information includes an image of at least part of the sheet that was printed by the image forming apparatus;

a determining unit configured to determine an error based on the diagnostic information that was generated by the image forming apparatus when the image forming apparatus performed the diagnostic operation, wherein the determining unit is configured to determine the error by determining whether the image of the at least part of the sheet indicates that an edge of the at least part of the sheet is colored by a specific color; and a transfer unit configured to transfer additional AR information that includes additional AR guidance based on the determined error, wherein the additional AR guidance presents instructions for a user to clean a fuser in the image processing apparatus.

2. An information processing apparatus according to claim 1, wherein the receiving unit is configured to receive device identification information that corresponds to the image forming apparatus from the client apparatus, and wherein the sending unit is configured to send AR diagnostic information that corresponds to both the received status information and the received device identification information.

3. An information processing apparatus according to claim 1, wherein the sending unit is configured to send AR information that includes AR guidance for a second operation in response to the receiving unit receiving a request after completion of the diagnostic operation.

4. An information processing apparatus according to claim 1, wherein the obtaining unit is further configured to obtain one or more of a serial number, an error log, and a print counter, and wherein the determining unit is further configured to determine the error based on the one or more of the serial number, the error log, and the print counter.

5. An information processing apparatus according to claim 1, wherein the determining unit is further configured to determine the error based on data in a knowledge base.

6. A method for an information processing apparatus that communicates with a client apparatus and an image forming apparatus, the method comprising:

receiving status information from an image forming apparatus;

sending AR diagnostic information that commands a client apparatus to display AR guidance, wherein the AR guidance includes instructions that describe how to operate the image forming apparatus to perform a diagnostic operation, wherein the AR diagnostic information superimposes the AR guidance on an image captured by the client apparatus, and wherein the diagnostic operation is the printing of a sheet by the image forming apparatus;

obtaining diagnostic information that was generated by the image forming apparatus when the image forming apparatus performed the diagnostic operation and that includes a sign regarding an error that occurred in the image forming apparatus, wherein the diagnostic information includes an image of at least part of the sheet that was printed by the image forming apparatus;

determining an error based on the obtained diagnostic information that was generated by the image forming apparatus when the image forming apparatus performed the diagnostic operation, wherein the determining of the error is based on whether the image of the at least part of the sheet indicates that an edge of the at least part of the sheet is colored by a specific color; and transferring second AR information to command the client apparatus to display other AR guidance to recover from the determined error, wherein the other AR guidance presents instructions that guide a user to clean a fuser in the image processing apparatus.

7. A method according to claim 6, further comprising receiving device identification information of the image forming apparatus from the client apparatus, and sending the received device identification information with the AR diagnostic information.

8. A method according to claim 6, further comprising sending third AR information that includes AR guidance that includes instructions that describe how to operate the image forming apparatus to perform another diagnostic operation in response to receiving a request after completion of the diagnostic operation.

9. One or more non-transitory computer-readable media storing instructions that, when executed by one or more computing devices, cause the one or more computing devices to perform operations comprising:

receiving status information from an image forming apparatus;

sending AR diagnostic information that commands a client apparatus to display AR guidance, wherein the AR guidance includes instructions that describe how to operate the image forming apparatus to perform a diagnostic operation, wherein the AR diagnostic information superimposes the AR guidance on an image captured by the client apparatus, and wherein the diagnostic operation is the printing of a sheet by the image forming apparatus;

obtaining diagnostic information that was generated by the image forming apparatus when the image forming apparatus performed the diagnostic operation and that includes a sign regarding an error that occurred in the image forming apparatus, wherein the diagnostic information includes an image of at least part of the sheet that was printed by the image forming apparatus;

determining an error based on the obtained diagnostic information that was generated by the image forming apparatus when the image forming apparatus performed the diagnostic operation, wherein the determining of the error is based on whether the image of the at least part of the sheet indicates that an edge of the at least part of the sheet is colored by a specific color; and transferring second AR information to command the client apparatus to display other AR guidance to recover from the determined error, wherein the other AR guidance presents instructions that guide a user to clean a fuser in the image processing apparatus.

* * * * *